United States Patent
Nonaka et al.

(10) Patent No.: US 9,185,515 B2
(45) Date of Patent: Nov. 10, 2015

(54) NON-TRANSITORY STORAGE MEDIUM ENCODED WITH COMPUTER READABLE INFORMATION PROCESSING PROGRAM CAPABLE OF FURTHER ENHANCING ZEST OF DATA COMMUNICATION, INFORMATION PROCESSING APPARATUS, METHOD OF CONTROLLING INFORMATION PROCESSING APPARATUS, AND INFORMATION PROCESSING SYSTEM

(71) Applicant: NINTENDO CO., LTD., Kyoto (JP)

(72) Inventors: Toyokazu Nonaka, Kyoto (JP); Toshiharu Izuno, Kyoto (JP); Koichi Ishii, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 544 days.

(21) Appl. No.: 13/653,625

(22) Filed: Oct. 17, 2012

(65) Prior Publication Data
US 2013/0331030 A1   Dec. 12, 2013

(30) Foreign Application Priority Data

Jun. 7, 2012 (JP) .................................. 2012-129926
Jun. 7, 2012 (JP) .................................. 2012-129929

(51) Int. Cl.
*H04B 7/00* (2006.01)
*H04W 4/00* (2009.01)
(52) U.S. Cl.
CPC ..................................... *H04W 4/008* (2013.01)
(58) Field of Classification Search
USPC ................ 455/3.01, 3.05, 3.06, 414.1, 414.4, 455/41.1, 41.2, 500, 502
See application file for complete search history.

(56) References Cited

U.S. PATENT DOCUMENTS

| | | | | |
|---|---|---|---|---|
| 7,917,608 B2* | 3/2011 | Tsunoda et al. | ............... | 709/223 |
| 8,284,797 B2* | 10/2012 | Mosig | ............ | 370/466 |
| 8,396,466 B2* | 3/2013 | Sharma et al. | ............... | 455/420 |
| 8,417,233 B2* | 4/2013 | Woloshyn | ...................... | 455/418 |
| 8,595,251 B2* | 11/2013 | Velusamy | ...................... | 707/759 |
| 8,661,073 B2* | 2/2014 | Lee et al. | ....................... | 709/203 |
| 8,753,209 B2* | 6/2014 | Kothari et al. | .................. | 463/42 |
| 8,888,598 B2* | 11/2014 | Mehta et al. | ..................... | 463/42 |
| 9,089,772 B2* | 7/2015 | Anderson et al. | ..................... | 1/1 |
| 2004/0259642 A1 | 12/2004 | Tanaka et al. | | |
| 2009/0005116 A1* | 1/2009 | Sharma et al. | ................ | 455/557 |

(Continued)

FOREIGN PATENT DOCUMENTS

JP     2005-28103     2/2005

*Primary Examiner* — Tuan A Tran
(74) *Attorney, Agent, or Firm* — Nixon & Vanderhye PC

(57) ABSTRACT

An exemplary embodiment provides a non-transitory storage medium. The non-transitory storage medium causes the computer of an information processing apparatus capable of communicating with another information processing apparatus to function as a data reception unit configured to receive application data which can be made use of by an application program from another information processing apparatus, a data determination unit configured to determine whether the received application data is data made use of by a first application program executed by the information processing apparatus, and a data conversion unit configured to convert the received application data to application data made use of by the first application program executed by the information processing apparatus when the data determination unit determines that the received application data is not data made use of by the first application program executed by the information processing apparatus.

14 Claims, 20 Drawing Sheets

(56) References Cited

U.S. PATENT DOCUMENTS

| | | | |
|---|---|---|---|
| 2009/0239516 A1* | 9/2009 | Van Eck et al. | 455/418 |
| 2010/0306249 A1* | 12/2010 | Hill et al. | 707/769 |
| 2013/0065521 A1* | 3/2013 | Jang et al. | 455/41.1 |
| 2014/0038718 A1* | 2/2014 | Kothari et al. | 463/40 |

* cited by examiner

| GAME X | |
|---|---|
| SEX | MALE |
| FACE PART | PART CC |
| FACIAL EXPRESSION | PATTERN GG |

(B)

| GAME Y | |
|---|---|
| SEX | MALE |
| BIRTHDAY | MM DD |
| PERSONALITY | MILD |

| GAME X | |
|---|---|
| SEX | MALE |
| FACE PART | PART CC |
| FACIAL EXPRESSION | PATTERN GG |

(B)

| USER REGISTRATION DATA | |
|---|---|
| SEX | MALE |
| BIRTHDAY | MM DD |
| USER NAME | abcd |

NON-TRANSITORY STORAGE MEDIUM ENCODED WITH COMPUTER READABLE INFORMATION PROCESSING PROGRAM CAPABLE OF FURTHER ENHANCING ZEST OF DATA COMMUNICATION, INFORMATION PROCESSING APPARATUS, METHOD OF CONTROLLING INFORMATION PROCESSING APPARATUS, AND INFORMATION PROCESSING SYSTEM

This nonprovisional application is based on Japanese Patent Applications Nos. 2012-129926 and 2012-129929 filed with the Japan Patent Office on Jun. 7, 2012, the entire contents of which are hereby incorporated by reference.

FIELD

The technology herein relates to a non-transitory storage medium encoded with a computer readable information processing program, an information processing apparatus, a method of controlling an information processing apparatus, and an information processing system.

BACKGROUND AND SUMMARY

A system automatically carrying out communication when information processing apparatuses are proximate to each other has conventionally been present. There is such a system that communicating game devices check an exchange condition with each other, and when match in exchange condition is achieved, game data designated for exchange is exchanged between the game devices.

On the other hand, data is exchanged between game devices having data which can be made use of by the same application program (also simply referred to as an application). Therefore, when a game device with which communication is established does not have data which can be made use of by the same application, data is not exchanged.

The present application was made to solve the problem as described above, and provides a non-transitory storage medium encoded with a computer readable information processing program capable of further enhancing zest of data communication, an information processing apparatus, a method of controlling an information processing apparatus, and an information processing system.

An exemplary embodiment provides a non-transitory storage medium encoded with a computer readable information processing program and executable by a computer of an information processing apparatus. The computer of the information processing apparatus capable of communicating with another information processing apparatus is caused to function as a data reception unit configured to receive application data which can be made use of by an application program from another information processing apparatus, a data determination unit configured to determine whether or not the received application data is data made use of by a first application program executed by the information processing apparatus, and a data conversion unit configured to convert the received application data to application data made use of by the first application program executed by the information processing apparatus when the data determination unit determines that the received application data is not data made use of by the first application program executed by the information processing apparatus.

In the exemplary embodiment, the computer may be caused to function as a data transmission unit configured to transmit application data which can be made use of by the application program to another information processing apparatus.

In the exemplary embodiment, the information processing apparatus can selectively execute a plurality of application programs, and each of the plurality of application programs may cause the computer to function as a data storage control unit configured to cause a memory to store application data corresponding to the application program.

In the exemplary embodiment, the data conversion unit may convert the received application data to application data made use of by the first application program executed by the information processing apparatus when the data determination unit determines that the received application data is not data made use of by the first application program executed by the information processing apparatus but data made use of by a second application program different from the first application program.

In the exemplary embodiment, the second application program may be pre-installed in the information processing apparatus.

In the exemplary embodiment, the computer may be caused to function as an application processing unit configured to execute the first application program by using the received application data when the application data received by the data reception unit is data made use of by the first application program executed by the information processing apparatus and executing the first application program by using the converted application data when it is not data made use of by the first application program executed by the information processing apparatus.

In the exemplary embodiment, the received application data may be data on a character.

In the exemplary embodiment, the data on a character may be data on characteristics of the character.

In the exemplary embodiment, the information processing apparatus includes a wireless communication module, and the data reception unit may communicate by radio with another information processing apparatus by using the wireless communication module.

In the exemplary embodiment, the data reception unit may communicate by radio with another information processing apparatus by using the wireless communication module, regardless of whether or not the application program is executed.

In the exemplary embodiment, the data reception unit may communicate by radio with another information processing apparatus present within a certain distance by using the wireless communication module, regardless of whether or not the application program is executed.

An exemplary embodiment provides an information processing apparatus.

The information processing apparatus is an information processing apparatus capable of communicating with another information processing apparatus, and includes a data reception unit configured to receive application data which can be made use of by an application program from another information processing apparatus, a data determination unit configured to determine whether or not the received application data is data made use of by a prescribed application program executed by the information processing apparatus, and a data conversion unit configured to convert the received application data to application data made use of by a first application program executed by the information processing apparatus when the data determination unit determines that the received application data is not data made use of by the first application program executed by the information processing apparatus.

An exemplary embodiment provides a method of controlling an information processing apparatus. The method of controlling an information processing apparatus is a method of controlling an information processing apparatus capable of communicating with another information processing apparatus, and includes receiving application data which can be made use of by an application program from another information processing apparatus, determining whether or not the received application data is data made use of by a prescribed application program executed by the information processing apparatus, and converting the received application data to application data made use of by the prescribed application program executed by the information processing apparatus when it is determined that the received application data is not data made use of by the prescribed application program executed by the information processing apparatus.

An exemplary embodiment provides an information processing system. The information processing system includes an information processing apparatus and another information processing apparatus capable of communicating with the information processing apparatus, and the information processing apparatus includes a data reception unit configured to receive application data which can be made use of by an application program from another information processing apparatus, a data determination unit configured to determine whether or not the received application data is data made use of by a prescribed application program executed by the information processing apparatus, and a data conversion unit configured to convert the received application data to application data made use of by a first application program executed by the information processing apparatus when the data determination unit determines that the received application data is not data made use of by the first application program executed by the information processing apparatus.

An exemplary embodiment provides a non-transitory storage medium encoded with a computer readable information processing program and executable by a computer of an information processing apparatus. Functions as a data reception unit configured to receive data from another information processing apparatus, a data determination unit configured to determine whether or not the data received by the data reception unit is data made use of by a prescribed application program executed by the information processing apparatus, and a data generation unit configured to generate application data made use of by the prescribed application program executed by the information processing apparatus by making use of device information included in the received data, of another information processing apparatus which has transmitted the data, when the data determination unit determines that the data received by the data reception unit is not data made use of by the prescribed application program executed by the information processing apparatus are achieved.

In the exemplary embodiment, the computer may be caused to function as a data transmission unit configured to transmit application data which can be made use of by the application program to another information processing apparatus.

In the exemplary embodiment, the device information of another information processing apparatus may be user information set and registered for another information processing apparatus in response to a user's instruction making use of another information processing apparatus.

In the exemplary embodiment, the user information may be information including at least one of a name, sex, and birthday of a user who makes use of another information processing apparatus.

In the exemplary embodiment, the information processing apparatus includes a wireless communication module, and the data reception unit may communicate by radio with another information processing apparatus by using the wireless communication module.

In the exemplary embodiment, the data reception unit may communicate by radio with another information processing apparatus by using the wireless communication module, regardless of whether or not the application program is executed.

In the exemplary embodiment, the data reception unit may communicate by radio with another information processing apparatus present within a certain distance by using the wireless communication module, regardless of whether or not the application program is executed.

An exemplary embodiment provides an information processing apparatus. The information processing apparatus is an information processing apparatus capable of communicating with another information processing apparatus, and includes a data reception unit configured to receive data from another information processing apparatus, a data determination unit configured to determine whether or not the data received by the data reception unit is data made use of by a prescribed application program executed by the information processing apparatus, and a data generation unit configured to generate application data made use of by the prescribed application program executed by the information processing apparatus by making use of device information included in the received data, of another information processing apparatus which has transmitted the data, when the data determination unit determines that the data received by the data reception unit is not data made use of by the prescribed application program executed by the information processing apparatus.

An exemplary embodiment provides a method of controlling an information processing apparatus. The method of controlling an information processing apparatus includes receiving data from another information processing apparatus, determining whether or not the received data is data made use of by a prescribed application program executed by the information processing apparatus, and generating application data made use of by the prescribed application program executed by the information processing apparatus by making use of device information included in the received data, of another information processing apparatus which has transmitted the data, when it is determined that the received data is not data made use of by the prescribed application program executed by the information processing apparatus.

An exemplary embodiment provides an information processing system. The information processing system includes an information processing apparatus and another information processing apparatus capable of communicating with the information processing apparatus, and the information processing apparatus includes a data reception unit configured to receive data from another information processing apparatus, a data determination unit configured to determine whether or not the data received by the data reception unit is data made use of by a prescribed application program executed by the information processing apparatus, and a data generation unit configured to generate application data made use of by the prescribed application program executed by the information processing apparatus by making use of device information included in the received data, of another information processing apparatus which has transmitted the data, when the data determination unit determines that the data received by the data reception unit is not data made use of by the prescribed application program executed by the information processing apparatus.

According to the exemplary embodiment, zest of data communication can be enhanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an exemplary illustrative non-limiting diagram for illustrating exchange data stored in internal storage device 14 of portable game device 1 according to the first exemplary embodiment.

FIG. 16 shows an exemplary illustrative non-limiting diagram for illustrating exchange data stored in internal storage device 14 of portable game device 1 according to the second exemplary embodiment.

DETAILED DESCRIPTION OF NON-LIMITING EXAMPLE EMBODIMENTS

Figure 1:
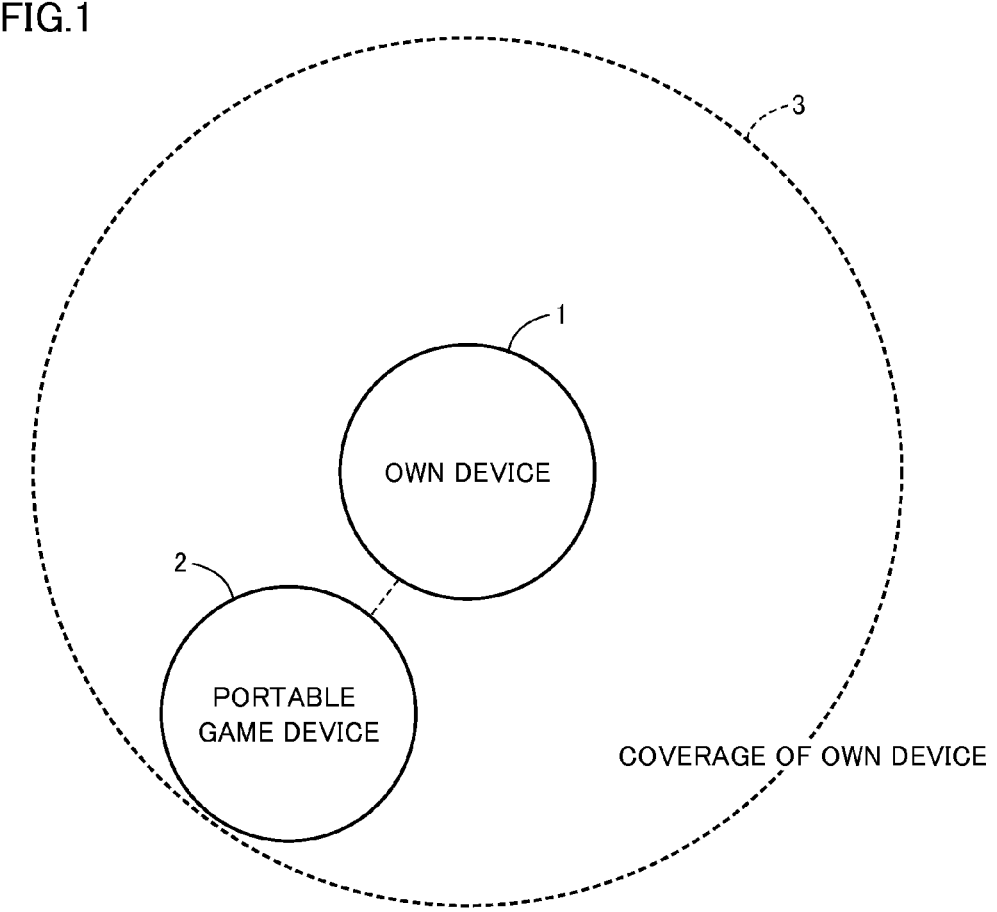
FIG. 1 shows an exemplary illustrative non-limiting diagram for illustrating coverage of an information processing apparatus according to an exemplary embodiment.

This embodiment will be described in detail with reference to the drawings. The same or corresponding elements in the drawings have the same reference characters allotted and description thereof will not be repeated.

<Overall Configuration>

FIG. 1 is a diagram for illustrating coverage of an information processing apparatus according to the present embodiment.

Referring to FIG. 1, a case where portable game devices (hereinafter also simply referred to as game devices) 1, 2 are provided by way of example of a plurality of portable information processing apparatuses is shown. In addition, a configuration can also be such that a plurality of portable game devices are provided.

Portable game devices 1, 2 can transmit and receive data by carrying out wireless communication, and a case where portable game device 1 (hereinafter also simply referred to as own device) and portable game device 2 communicate with each other will be described in the present example.

Moreover, FIG. 1 shows with a dotted line, coverage 3 indicating a certain distance within which portable game device 1 (own device) can communicate when it carries out wireless communication. Namely, the example in FIG. 1 shows that portable game device 1 (own device) is in such a state as being able to communicate with portable game device 2 in coverage 3 and shows that portable game device 1 is communicating by radio with portable game device 2.

<Configuration of Portable Game Device>

Figure 2:
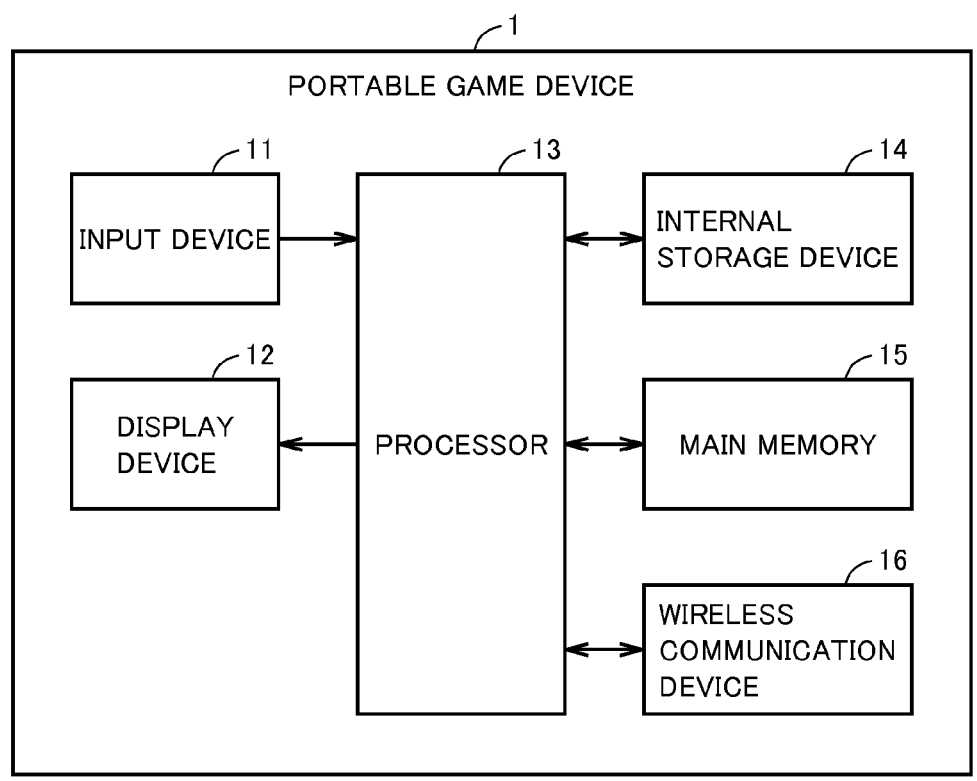
FIG. 2 shows an exemplary illustrative non-limiting schematic block diagram of a configuration of a portable game device 1 according to the exemplary embodiment.

FIG. 2 is a schematic block diagram of a configuration of portable game device 1 according to the present embodiment. Since the configuration is also the same in other portable game devices, detailed description thereof will not be provided.

Referring to FIG. 2, portable game device 1 includes an input device 11, a display device 12, a processor 13, an internal storage device 14, a main memory 15, and a wireless communication device (wireless communication module) 16.

Input device 11 is operated by a user of portable game device 1 and outputs a signal in response to the user's operation to processor 13. Input device 11 is implemented, for example, by a cross-shaped switch, a push button, or a touch pad.

Display device 12 displays an image generated by portable game device 1 on a screen. A liquid crystal display (LCD) can be employed as display device 12 by way of example.

Processor 13 is operation processing unit configured to execute a computer program.

Internal storage device 14 stores a computer program executed by processor 13. In addition, internal storage device 14 also stores data to be exchanged through near field communication for exchange which will be described later. A NAND-type flash memory can be employed as internal storage device 14 by way of example. It is noted that a computer program executed by processor 13 may be recorded in advance or may be obtained from another device through communication with another device.

Main memory 15 temporarily stores a computer program or information. A PSRAM (Pseudo-SRAM) can be employed as main memory 15 by way of example.

Wireless communication device 16 transmits and receives a signal to and from another portable game device through wireless communication.

<Outlines of Near Field Communication for Exchange>

Data communication between portable game devices according to the present embodiment will be described hereinafter.

In the present embodiment, portable game device 1 uses near field communication for exchange to be able to exchange data for application that can be made use of in a prescribed application program (hereinafter a prescribed game by way of example). Here, near field communication for exchange refers to such communication as repeatedly searching for another game device present at a short distance, such as another unspecified portable game device present within coverage of near field wireless communication, automatically transmitting prescribed data stored in internal storage device 14 (hereinafter exchange data) to another portable game device found as a result of search, and automatically receiving from another portable game device exchange data stored in internal storage device 14 of another portable game device. Near field communication for exchange is carried out, for example, when users carrying portable game devices pass each other. In addition, the exchange data is created based on a user's operation or the like and stored in advance in a prescribed area of internal storage device 14.

Examples of prescribed games include by way of example, various games such as a role playing game aiming to achieve an object by operating a character in the game on portable game device 1, a simulation game, and the like.

Examples of exchange data can include by way of example, data on a character which can appear in the game.

<First Embodiment>

Figure 3:
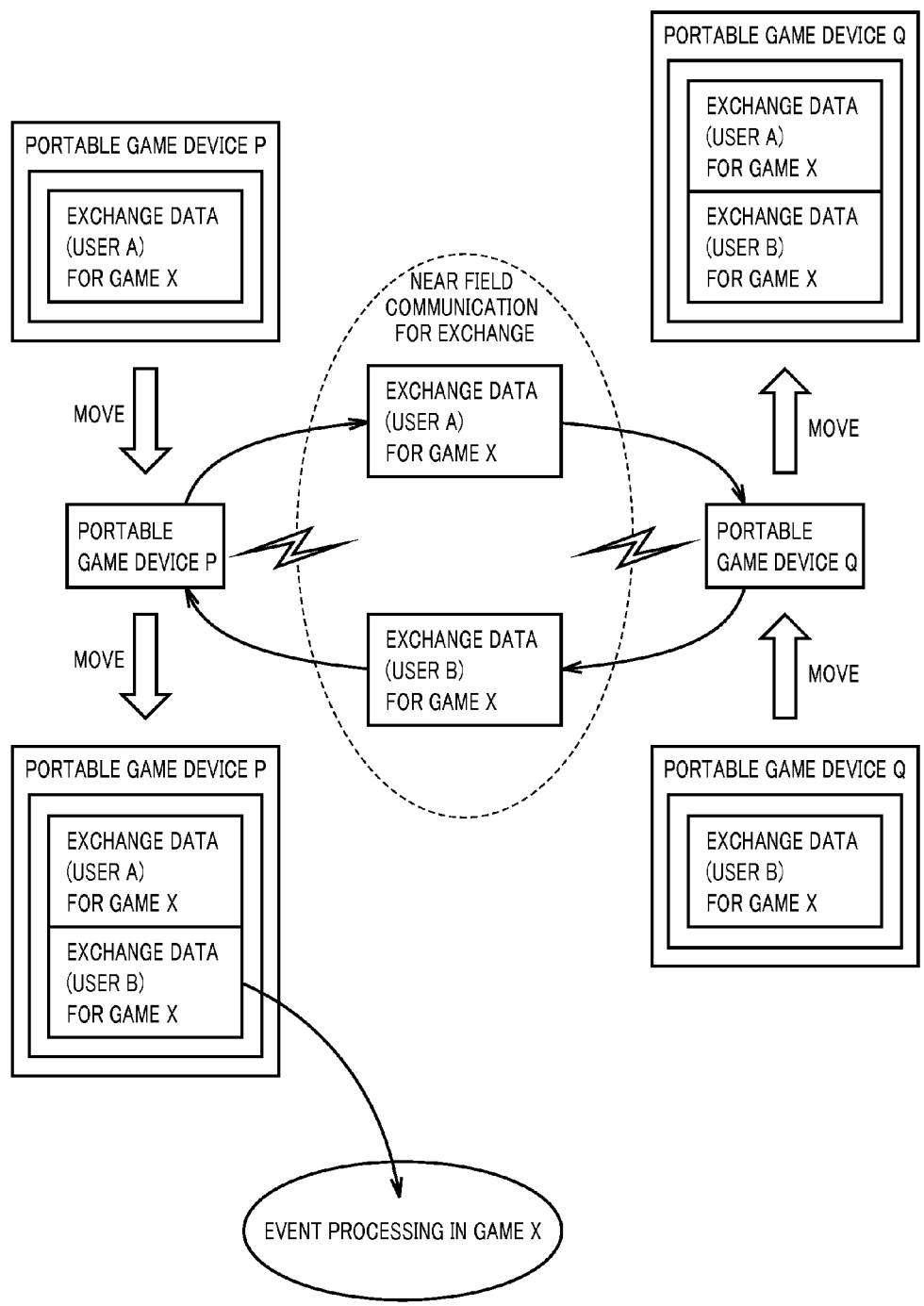
FIG. 3 shows an exemplary illustrative non-limiting diagram for illustrating a case where near field communication for exchange is carried out according to a first exemplary embodiment.

FIG. 3 is a diagram for illustrating a case where near field communication for exchange according to the present first embodiment is carried out.

Referring to FIG. 3, in the present example, a case where a user goes out with his/her portable game device is assumed by way of example.

Here, it is assumed that a portable game device P is made use of as a device possessed by a user A. In addition, it is assumed that a portable game device Q is made use of as a device possessed by a user B.

Then, a game X which is a prescribed application program is executed by user A in portable game device P, and consequently exchange data for game X (user A) is stored in internal storage device 14.

In addition, as a result of execution of game X by user B in portable game device Q, exchange data for game X (user B) is stored in internal storage device 14.

Then, as a result of near field communication for exchange at the time when portable game devices P and Q carried by the users pass each other, communication for transmitting and receiving their exchange data is carried out.

In the present example, communication for transmitting and receiving exchange data of user A included in the exchange data for game X and exchange data of user B included in the exchange data for game X between portable game devices P and Q is shown.

Thus, portable game device P will hold exchange data (user B) obtained from portable game device Q in addition to the exchange data (user A) for game X.

On the other hand, portable game device Q will hold the exchange data (user A) for game X in addition to the exchange data (user B) for game X.

Then, when user A executes game X in portable game device P, event processing based on exchanged data of another user (user B) is performed in game device X.

Specifically, by way of example, in portable game device P, as a result of near field communication for exchange at the time of passing, event processing based on the exchange data (user B) for game X obtained from portable game device Q is performed.

Therefore, event processing based on data of another user obtained through near field communication for exchange at the time of passing can be performed.

By way of example of this event processing, for example, such processing that a character included in the exchange data is caused to appear and talk to for obtaining information or an item in the game, or the like is exemplified.

Figure 4:
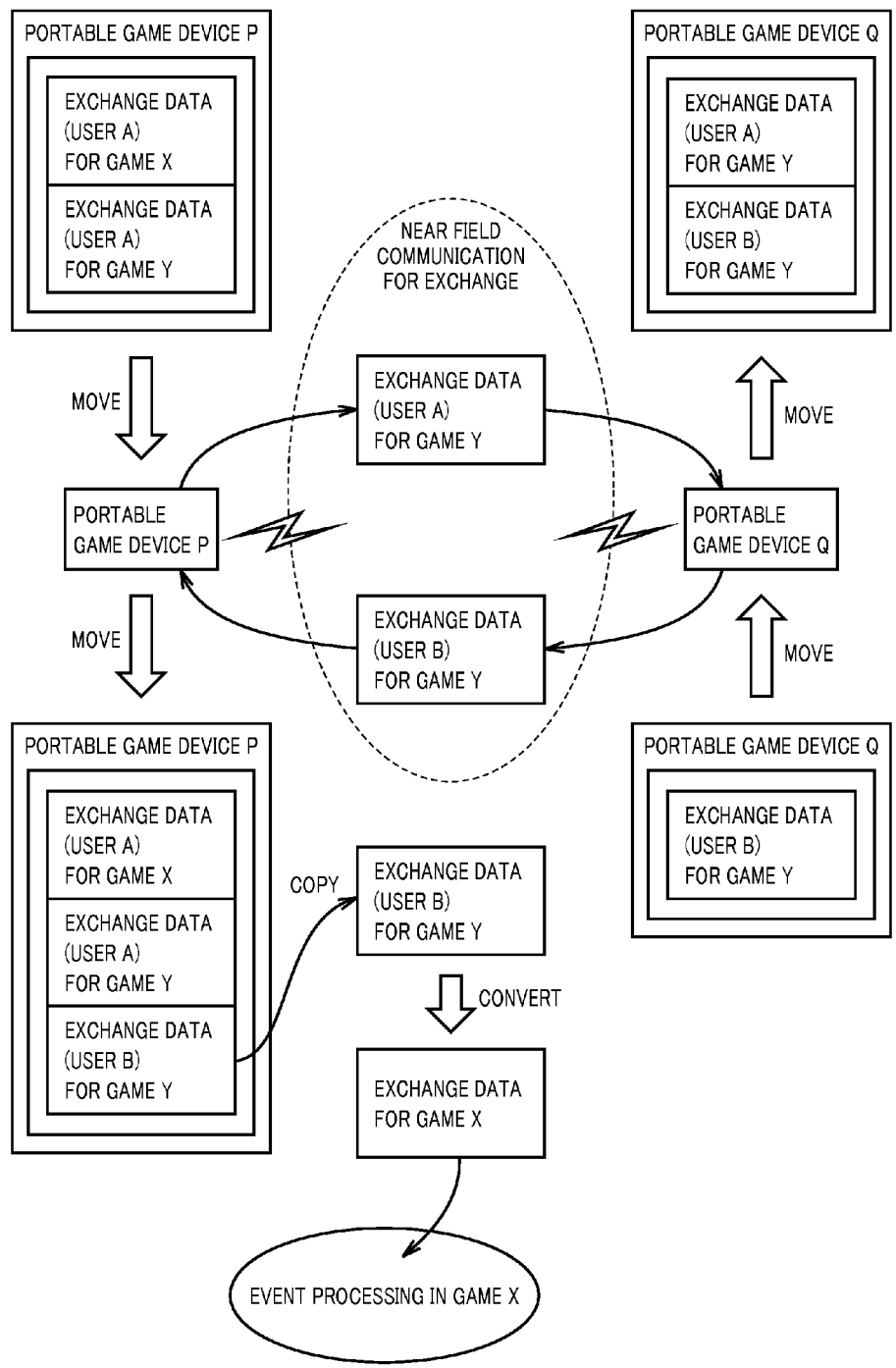
FIG. 4 shows an exemplary illustrative non-limiting diagram for illustrating a case where other near field communication for exchange is carried out according to the first exemplary embodiment.

FIG. 4 is a diagram for illustrating a case where other near field communication for exchange according to the present first embodiment is carried out.

Referring to FIG. 4, it is assumed that portable game device P is made use of as a device possessed by user A. In addition, it is assumed that portable game device Q is made use of as a device possessed by user B.

Then, game X which is an application program is executed by user A in portable game device P, and consequently the exchange data (user A) for game X is stored in internal storage device 14.

On the other hand, as a result of execution of a game Y which is another application program different from game X by user A in portable game device P, exchange data (user A) for game Y is stored in internal storage device 14.

Meanwhile, as a result of execution of game Y different from game X by user B in portable game device Q, exchange data (user B) for game Y is stored in internal storage device 14. Here, it is assumed that portable game device Q does not store exchange data for game X.

Then, when portable game devices P and Q carried by respective users pass each other, near field communication for exchange for exchange data on game Y occurs. Game X, however, is not stored in portable game device Q, and therefore transmission and reception of exchange data is not carried out. Namely, near field communication for exchange occurs for the same game.

In the present example, in the processing as well, when user A executes game X in portable game device P, event processing based on exchange data converted in game X is performed by converting exchange data on game Y to exchange data on game X.

Specifically, by way of example, in portable game device P, as a result of near field communication for exchange at the time of passing, exchange data for game Y obtained from portable game device Q is replicated (copied). Then, replicated exchange data for game Y is converted to exchange data for game X which can be processed by game X. Then, event processing based on the converted exchange data for game X is performed.

Therefore, even in the case not obtaining data on the same game through near field communication for exchange at the time of passing, event processing based on the converted data can be performed by using the data on another game different in type of game which is obtained through near field communication for exchange to convert the data to exchange data which can be processed by the game. Namely, even in the case not obtaining data on the same game through near field communication for exchange, event processing based on obtained data of another game different in type can be performed. Therefore, opportunities for event processing increase and zest of data communication can be enhanced.

Figure 5:
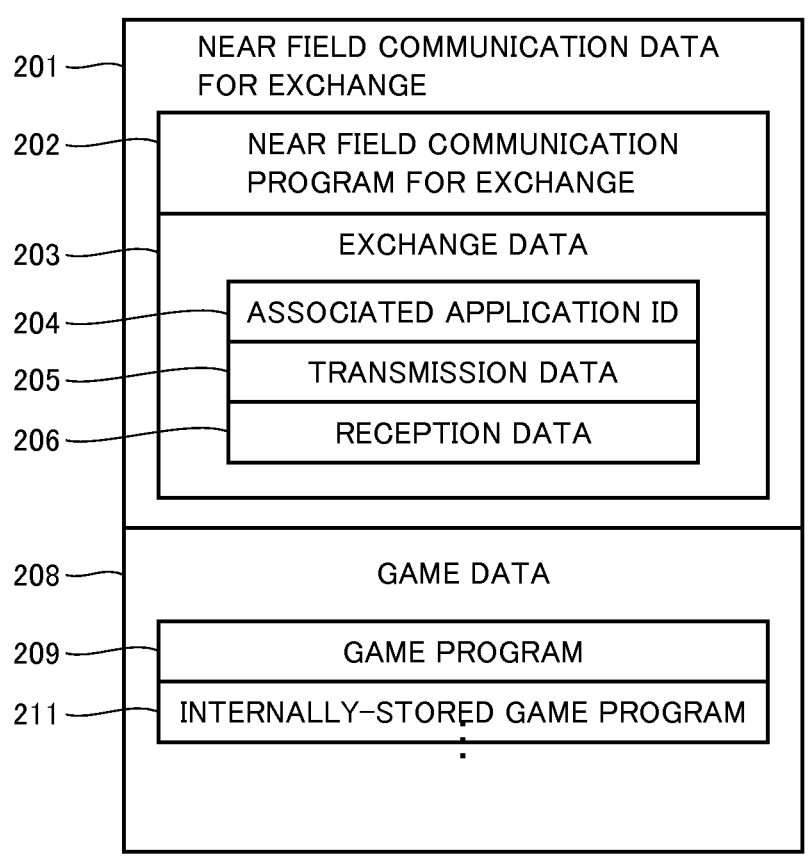
FIG. 5 shows an exemplary illustrative non-limiting diagram for illustrating one example of a program and information stored in an internal storage device 14 of portable game device 1 according to the first exemplary embodiment.

FIG. 5 is a diagram for illustrating one example of a program and information stored in internal storage device 14 of portable game device 1 according to the present first embodiment.

Referring to FIG. 5, near field communication data for exchange 201 includes a near field communication program for exchange 202 and exchange data 203.

Near field communication data for exchange 201 is loaded from internal storage device 14 to main memory 15 as necessary.

Near field communication program for exchange 202 is a program for carrying out near field communication for exchange.

Exchange data 203 is configured with an associated application ID 204 which is data representing a prescribed application program (game) associated with the data, transmission data 205 which is exchange data or the like to be transmitted through near field communication for exchange, and reception data 206 which is exchange data or the like received from another portable game device 1 through near field communication for exchange.

Exchange data 203 is set during exchange data setting processing which will be described later.

In addition, game data 208 is a game program for performing game processing and loaded from internal storage device 14 to main memory 15 as necessary.

The present example includes a game program 209 for performing certain game processing and an internally-stored game program 211 for performing other game processing different from the game processing. These game programs can selectively be executed.

It is assumed, for example, that internally-stored game program 211 has been stored (pre-installed) in portable game device 1 in advance since shipment or the like by way of example. The game program may be read from an external storage device and stored in internal storage device 14, or may be received from another portable game device or a server device and stored in internal storage device 14. It is noted that additional game programs may be stored in game data 208.

In the present example, for example, description will be given assuming that game program 209 corresponds to game X and internally-stored game program 211 corresponds to game Y.

FIG. 6 is a diagram for illustrating exchange data stored in internal storage device 14 in portable game device 1 according to the present first embodiment.

Referring to FIG. 6(A), here, one example of exchange data for game X stored in internal storage device 14 when game program 209 is executed is shown.

Specifically, a case where data on a character is stored as exchange data for game X is shown. By way of example, in the present example, it is assumed that data on "sex", "face part", and "facial expression" representing characteristics of the character is stored, and "sex", "face part", and "facial expression" are stored as "male", "face part CC," and "facial expression pattern GG," respectively.

For example, when the exchange data is transmitted from portable game device P as transmission data to portable game device Q, event processing based on the exchange data is performed in game X executed by portable game device Q. For example, in game X, a character based on data representing characteristics of a character included in the exchange data is displayed.

Referring to FIG. 6(B), here, one example of exchange data for game Y stored in internal storage device 14 when internally-stored game program 211 is executed is shown.

Specifically, a case where data on a character is stored as exchange data for game Y is shown. By way of example, in the present example, it is assumed that data on "sex", "birthday", and "personality" representing characteristics of a character is stored and "sex", "birthday", and "personality" are stored as "male", "mm dd", and "mild", respectively.

For example, when the exchange data is transmitted from portable game device P as transmission data to portable game device Q, event processing based on the exchange data is performed in game Y executed by portable game device Q. For example, in game Y, a character based on data representing characteristics of a character included in the exchange data is displayed.

Figure 7:
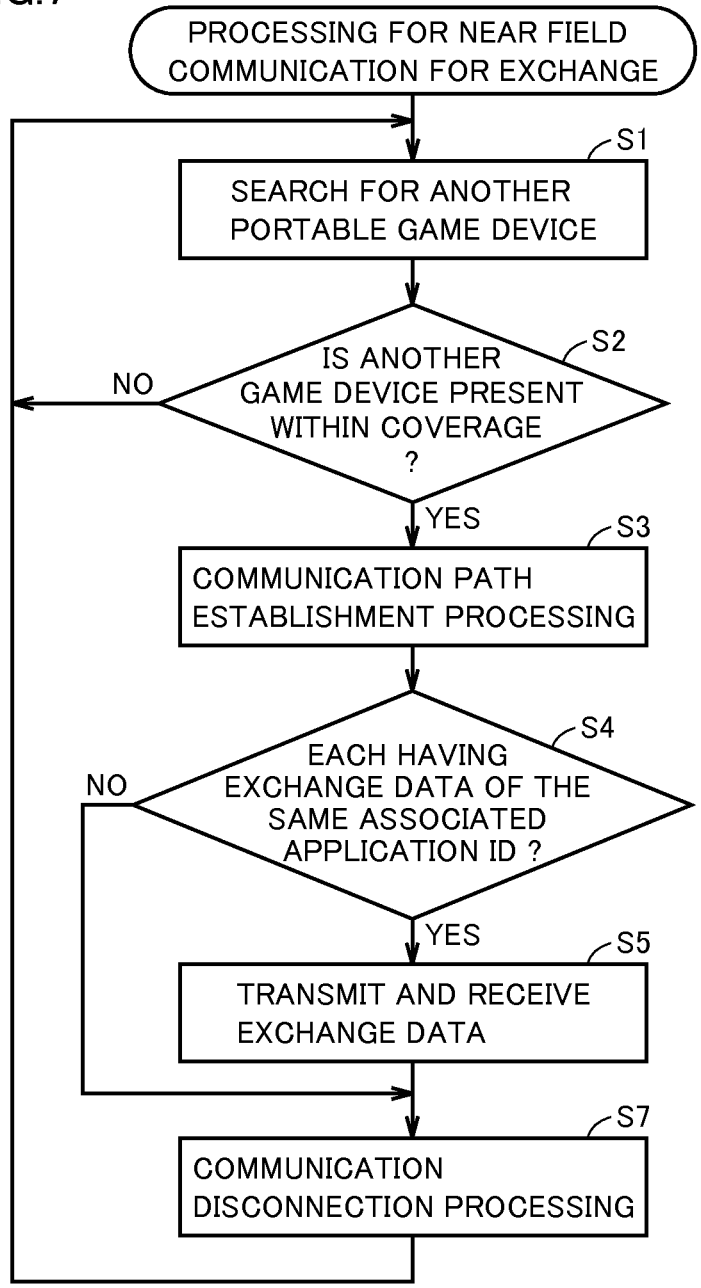
FIG. 7 shows an exemplary illustrative non-limiting flowchart for illustrating processing for near field communication for exchange according to the first exemplary embodiment.

FIG. 7 is a flowchart for illustrating processing for near field communication for exchange according to the present first embodiment.

Referring to FIG. 7, processing for near field communication for exchange is performed as processor 13, wireless communication device 16, and the like of portable game device 1 cooperate with one another in accordance with near field communication program for exchange 202. This processing is processing performed as background processing, for example, when portable game device 1 is in what is called a sleep state (which may also be referred to as a stand-by state or the like). Namely, the processing is independent of game processing in accordance with a game program, and processing for near field communication for exchange is processing for wireless communicating with another portable game device with the use of wireless communication device 16, regardless of whether a game program is executed or not.

For example, during sleep, basically, wireless communication device 16 mainly operates, sleep of processor 13 is temporarily canceled as necessary, and such control that processor 13 temporarily becomes an executing entity is carried out (for example, processing for searching for another portable game device is performed in wireless communication device 16 and transmission and reception of data is carried out in processor 13, etc.). In addition, for example, a second processor operable with low power consumption may be provided separately from processor 13, and the second processor may serve as an executing entity during sleep. In addition, the present processing may be performed as appropriate in response to a user's instruction operation or the like unless a sleep state is set.

Initially, processing for searching for another portable game device is performed (step S1). This is done, for example, as portable game device 1 repeats processing for transmitting a beacon indicating a connection request and processing for receiving this beacon.

Then, as a result of search above, whether or not another portable game device is present within coverage is determined (step S2). For example, determination as YES is made when a signal responding to the transmitted beacon is received from another portable game device within a prescribed period of time or when a beacon is received from another portable game device.

When it is determined in step S2 that another portable game device is not present within coverage (NO in step S2), the process returns to step S1 and the processing is repeated.

On the other hand, when it is determined in step S2 that another portable game device is present within coverage (YES in step S2), the processing for establishing a communication path for carrying out near field communication for exchange is performed (step S3).

Then, when the communication path is established, transmission and reception of associated application ID 204 is carried out and whether or not each has the same associated application ID 204 is determined (step S4). Namely, whether or not exchange data 203 of the same game is prepared in both is determined.

When it is determined in step S4 that both have the same associated application ID 204 (YES in step S4), processing for transmitting transmission data 205 and processing for receiving data sent from another portable game device as reception data 206 and storing that data are performed (step S5).

Then, processing for disconnecting near field communication for exchange is performed (step S7). Thereafter, the process returns to step S1 and the processing is repeated, for example, until the sleep state is canceled.

On the other hand, when it is determined that both do not have the same associated application ID 204 (NO in step S4), the processing in step S5 is skipped and the process proceeds to step S7, where processing for disconnecting near field communication for exchange is performed (step S7). Thereafter, the process returns to step S1 and the processing is repeated, for example, until the sleep state is canceled. Therefore, in the case where the game is not the same, transmission and reception using the exchange data is not carried out.

Figure 8:
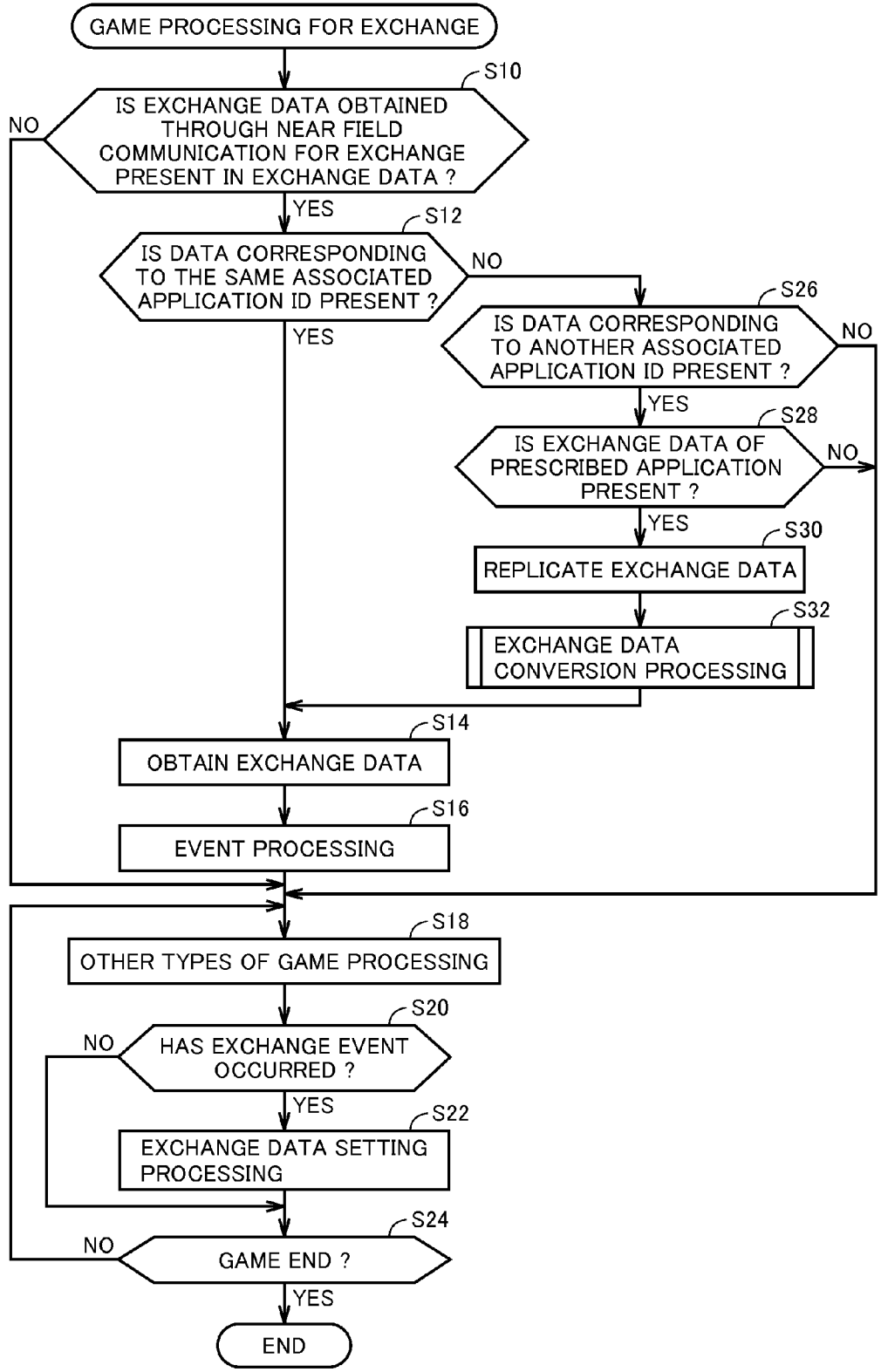
FIG. 8 shows an exemplary illustrative non-limiting flowchart for illustrating a flow of game processing in portable game device 1 according to the first exemplary embodiment.

FIG. 8 is a flowchart for illustrating a flow of game processing in portable game device 1 according to the present first embodiment.

Referring to FIG. 8, the game processing is performed by processor 13 of portable game device 1.

When execution of game program 209 (game X) is started in response to a user's instruction, reception data 206 of exchange data 203 is referred to, and whether or not exchange data obtained through near field communication for exchange is present in exchange data 203 is determined (step S10).

Then, when it is determined in step S10 that obtained exchange data is present in reception data 206 of exchange data 203 (YES in step S10), whether or not exchange data corresponding to an associated application ID the same as the associated application ID corresponding to game program 209 being executed is present is determined (step S12). In the present example, whether or not exchange data for game X is present is determined.

When it is determined in step S12 that the exchange data corresponding to the associated application ID the same as the associated application ID corresponding to game program 209 being executed is present (YES in step S12), the exchange data obtained through near field communication for exchange is obtained (step S14).

Then, event processing based on the obtained exchange data is performed (step S16). For example, it is assumed that such processing that a character is caused to appear and talk to based on data representing characteristics of the character included in the exchange data is performed to thereby be able to obtain information or an item. It is noted that, when the event processing is performed, the exchange data obtained from reception data 206 of exchange data 203 may be erased.

Then, other types of game processing are performed (step S18). For example, processing for operating a character to proceed with a game is performed.

Then, whether or not an exchange event has occurred is determined (step S20). For example, when a prescribed condition is satisfied, it can be determined that an exchange event has occurred. With regard to a prescribed condition, for example, when a user has performed such an operation as moving to a prescribed location in the game or placing or entrusting an item, it can be determined that a prescribed condition has been satisfied.

Then, when it is determined in step S20 that an exchange event has occurred (YES in step S20), exchange data setting processing is performed (step S22). Specifically, characteristic data of a character is stored as transmission data 205 of the exchange data in internal storage device 14.

Then, whether or not to end the game is determined (step S24). For example, determination can be made based on whether or not the user has indicated end.

When it is determined in step S24 to end the game (YES in step S24), the process ends (end).

On the other hand, when it is determined in step S24 that the game is not to end (NO in step S24), the process returns to step S18 and other types of game processing are performed. Then the processing above is repeated. On the other hand, when it is determined in step S10 that the obtained exchange data is not present in reception data 206 of exchange data 203 (NO in step S10), the process proceeds to step S18 without obtaining exchange data.

When it is determined in step S12 that the exchange data corresponding to the associated application ID the same as the associated application ID corresponding to game program 209 being executed is not present (NO in step S12), whether or not exchange data corresponding to another associated application ID different from the associated application ID corresponding to game program 209 being executed is present is determined (step S26).

When it is determined in step S26 that the exchange data corresponding to another associated application ID different from the associated application ID corresponding to game program 209 being executed is present (YES in step S26), then, whether or not exchange data of a prescribed application is present is determined (step S28). In the present example, whether or not exchange data for game Y is present is determined.

Then, when it is determined that exchange data for a prescribed application is present (YES in step S28), exchange data for a prescribed application is replicated (copied) (step S30). In the present example, exchange data for game Y is replicated as a prescribed application.

Then, processing for converting the exchange data is performed (step S32). The processing for converting the exchange data will be described later.

Then, the process proceeds to step S14, where the converted exchange data is obtained (step S14).

Subsequent processing is the same as described above.

When it is determined in step S26 that the exchange data corresponding to another associated application ID different from the associated application ID corresponding to game program 209 being executed is not present (NO in step S26) or when it is determined in step S28 that exchange data for a prescribed application is not present (NO in step S28), the process proceeds to step S18 without obtaining exchange data.

Figure 9:
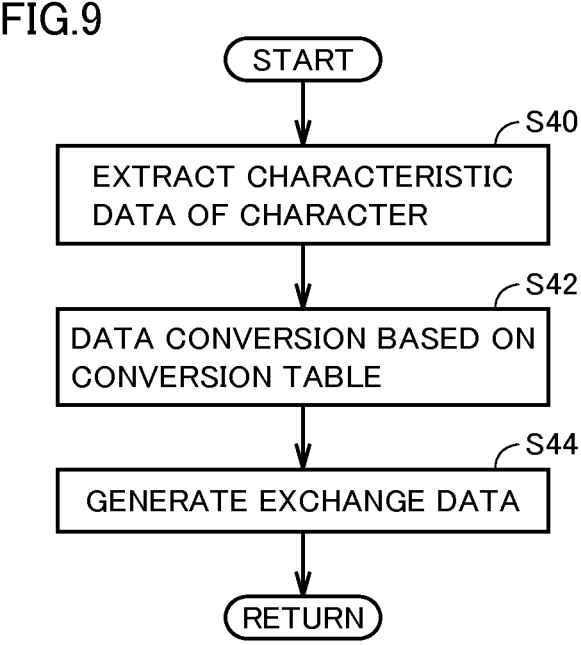
FIG. 9 shows an exemplary illustrative non-limiting flowchart for illustrating processing for converting exchange data according to the first exemplary embodiment.

FIG. 9 is a flowchart for illustrating the processing for converting the exchange data according to the present first embodiment.

Referring to FIG. 9, initially, with regard to the exchange data for a replicated prescribed application (game Y), in the present example, characteristic data of a character included in the exchange data is extracted (step S40).

Then, the extracted characteristic data of the character is converted based on a conversion table (step S42).

Then, exchange data for a corresponding application (game X) is generated in accordance with the converted data (step S44).

Then, the process ends (return).

Figure 10:
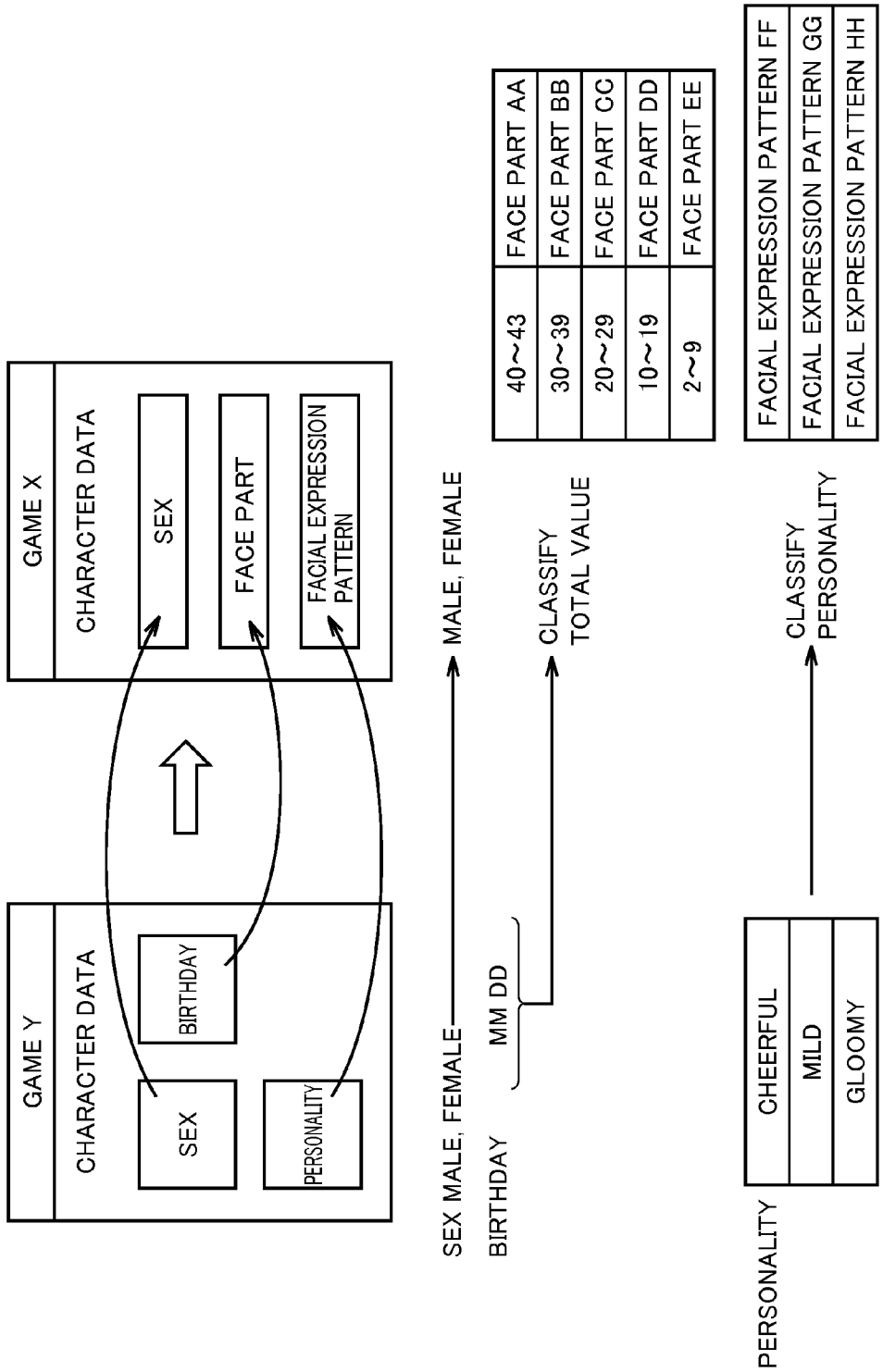
FIG. 10 shows an exemplary illustrative non-limiting diagram for illustrating a specific example of processing for converting exchange data according to the first exemplary embodiment.

FIG. 10 is a diagram for illustrating a specific example of the processing for converting the exchange data according to the present first embodiment.

Referring to FIG. 10, here, a case where exchange data for game Y which is a prescribed application is converted as exchange data, to exchange data for game X is shown. In this regard, when a prescribed application is an internally-stored game program, another portable game device which is a communication counterpart also has the same internally-stored game program, and therefore the exchange data is highly likely to be transmitted and received therebetween. Therefore, opportunities for data transmission and reception increase and zest of data communication can be enhanced.

In the present example, by way of example, data on a character included in the exchange data for game Y is converted to data on a character included in the exchange data for game X.

Specifically, a table for converting "sex" representing a characteristic of a character in game Y to "sex" representing a characteristic of a character in game X, a table for converting "birthday" representing a characteristic of a character in game Y to "face part" representing a characteristic of a character in game X, and a table for converting "personality" representing a characteristic of a character in game Y to "facial expression" representing a characteristic of a character in game X are provided. The table for conversion is included in the game program for game X.

By way of example, with the table for converting "sex" representing a characteristic of a character in game Y, "sex male", "sex female" representing characteristics of characters in game Y are converted to "sex male", "sex female" representing characteristics of characters in game X, respectively.

In addition, with the table for converting "birthday" representing a characteristic of a character in game Y, a total value for numeric values brought in correspondence with day and month of "mm dd" is classified and converted to one of a plurality of "face parts". In the present example, by way of example, when the total value is "from 2 to 9," conversion to "face part EE" is made, when the total value is "from 10 to 19," conversion to "face part DD" is made, when the total value is "from 20 to 29," conversion to "face part CC" is made, when the total value is "from 30 to 39," conversion to "face part BB" is made, and when the total value is "from 40 to 43," conversion to "face part AA" is made.

With the table for converting "personality" representing a characteristic of a character in game Y, "cheerful", "mild", and "gloomy" are converted to "facial expression pattern FF," "facial expression pattern GG," and "facial expression pattern HH," respectively.

Through the processing, the exchange data for game Y can be converted to the exchange data for game X. Namely, exchange data for a certain application can be converted to exchange data for another application different from the application. Then, event processing based on the converted exchange data can be performed.

Figure 11:
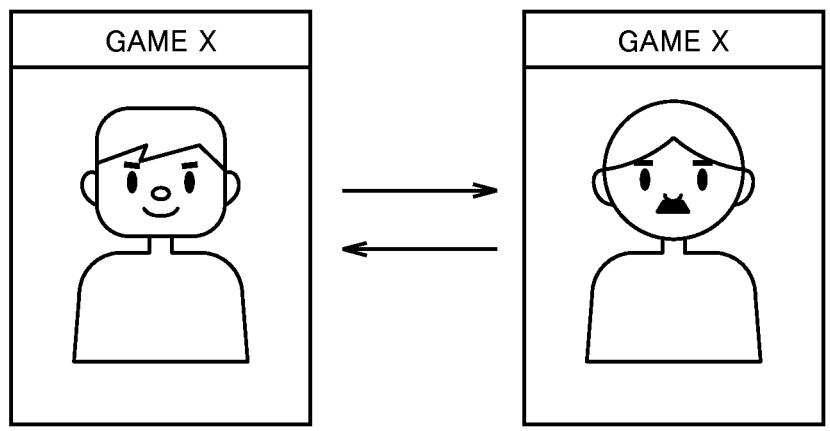
FIG. 11 shows an exemplary illustrative non-limiting diagram for illustrating a concept of transmission and reception and subsequent processing of exchange data according to the first exemplary embodiment.

FIG. 11 is a diagram for illustrating a concept of transmission and reception and subsequent processing of the exchange data according to the present first embodiment.

Referring to FIG. 11, in the present example, a case where the exchange data on the associated application ID corresponding to the same game program 209 is transmitted and received is shown.

Here, the exchange data for game X is transmitted and received, and for example, when portable game devices P and Q pass each other, the exchange data for game X transmitted from portable game device Q is received by portable game device P. By way of example, a case where data on a character of "person" is transmitted and received as the exchange data is shown. Then, when game X is executed, event processing based on the received exchange data for game X is performed. For example, a character of "person" received as the exchange data appears.

Figure 12:
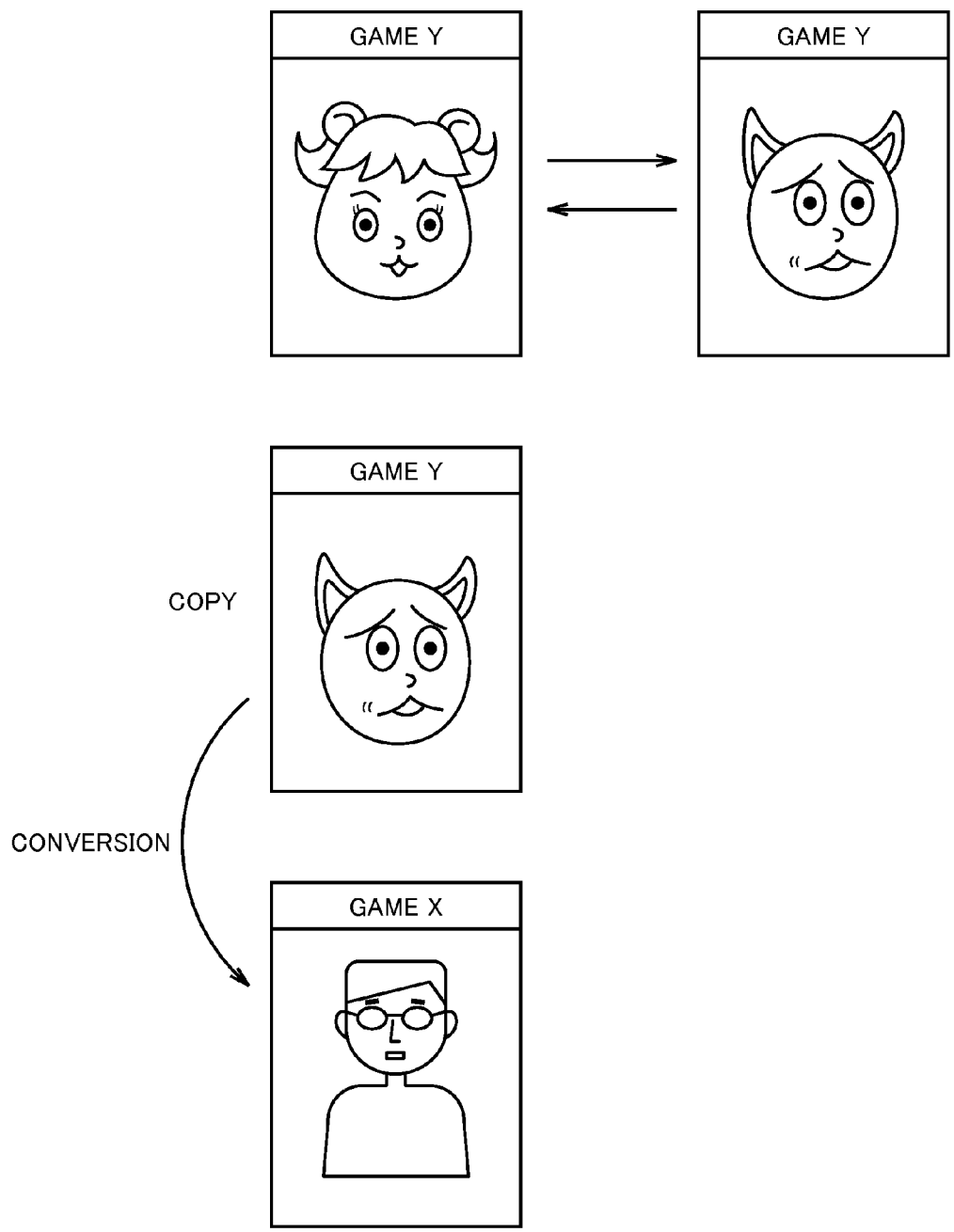
FIG. 12 shows an exemplary illustrative non-limiting diagram for illustrating a concept of transmission and reception and other subsequent processing of exchange data according to the first exemplary embodiment.

FIG. 12 is a diagram for illustrating a concept of transmission and reception and other subsequent processing of the exchange data according to the present first embodiment.

Referring to FIG. 12, in the present example as well, a case where the exchange data on the associated application ID corresponding to the same game program 209 is transmitted and received is shown.

Here, the exchange data for game Y is transmitted and received, and for example, when portable game devices P and Q pass each other, the exchange data for game Y transmitted from portable game device Q is received by portable game device P. By way of example, a case where data on a character of "monster" is transmitted and received as the exchange data is shown. Then, when game Y is executed, event processing based on the received exchange data for game Y is performed. For example, a character of "monster" received as the exchange data appears.

Furthermore, when game X is executed, the exchange data for game Y is replicated (copied) and converted to the exchange data for game X. For example, data representing a characteristic of the character of "monster" is converted to data representing a characteristic of the character of "person". Then, event processing based on the converted exchange data for game X is performed. For example, a character of a "person" appears in accordance with the converted exchange data.

Therefore, as a result of near field communication for exchange at the time of passing, even when the exchange data for the same application program is not transmitted or received but when the exchange data for another prescribed application program different from the application program is transmitted and received, the exchange data for another prescribed application program different from the received application program can be converted to the exchange data for the same application program. Then, event processing using the converted exchange data can be performed.

Namely, even though a portable game device and another portable game device do not have data which can be made use of by the same application program, an opportunity for data communication (exchange) with another portable game device is made use of for conversion to application data which can be made use of by the portable game device itself. Thus, zest of data communication can be enhanced.

Though a case where data on a character included in exchange data for a certain application program is extracted and converted to data on a character for exchange data for another application program different from the application program has been described in the present example, the data is not particularly limited to data on a character. Data on an item or some kind of data included in the exchange data may be used for conversion to exchange data for another application program different from the application program. In addition, though a case where tables for converting sex, birthday, personality, and the like to sex, face part, and facial expression pattern, respectively, are provided has been described by way of example in the present example, the table is not particularly limited to those tables. A part of exchange data for a prescribed application should only be made use of to thereby provide as appropriate a table capable of conversion to exchange data for an application to be converted. Furthermore, the number of prescribed applications is not limited to one and a plurality of applications may be provided. In the case of the plurality of applications, a table capable of conversion to exchange data should only be provided for each application.

Though a case where game Y is an internally-stored game program has been described above for the description of a case of conversion of exchange data for game Y to exchange data for game X, limitation to such a case is not intended, and any game program can be used so long as a game is different from game X.

In addition, in the configuration above, a case where exchanged exchange data for a certain application program is replicated (copied) and the replicated (copied) exchange data is converted to another application program different from the application program has been described, however, exchange data exchanged without being replicated may be converted to another application program different from the application program. It is noted that, in that case, the processing in step S30 in FIG. 8 is not necessary.

<Second Embodiment>

Figure 13:
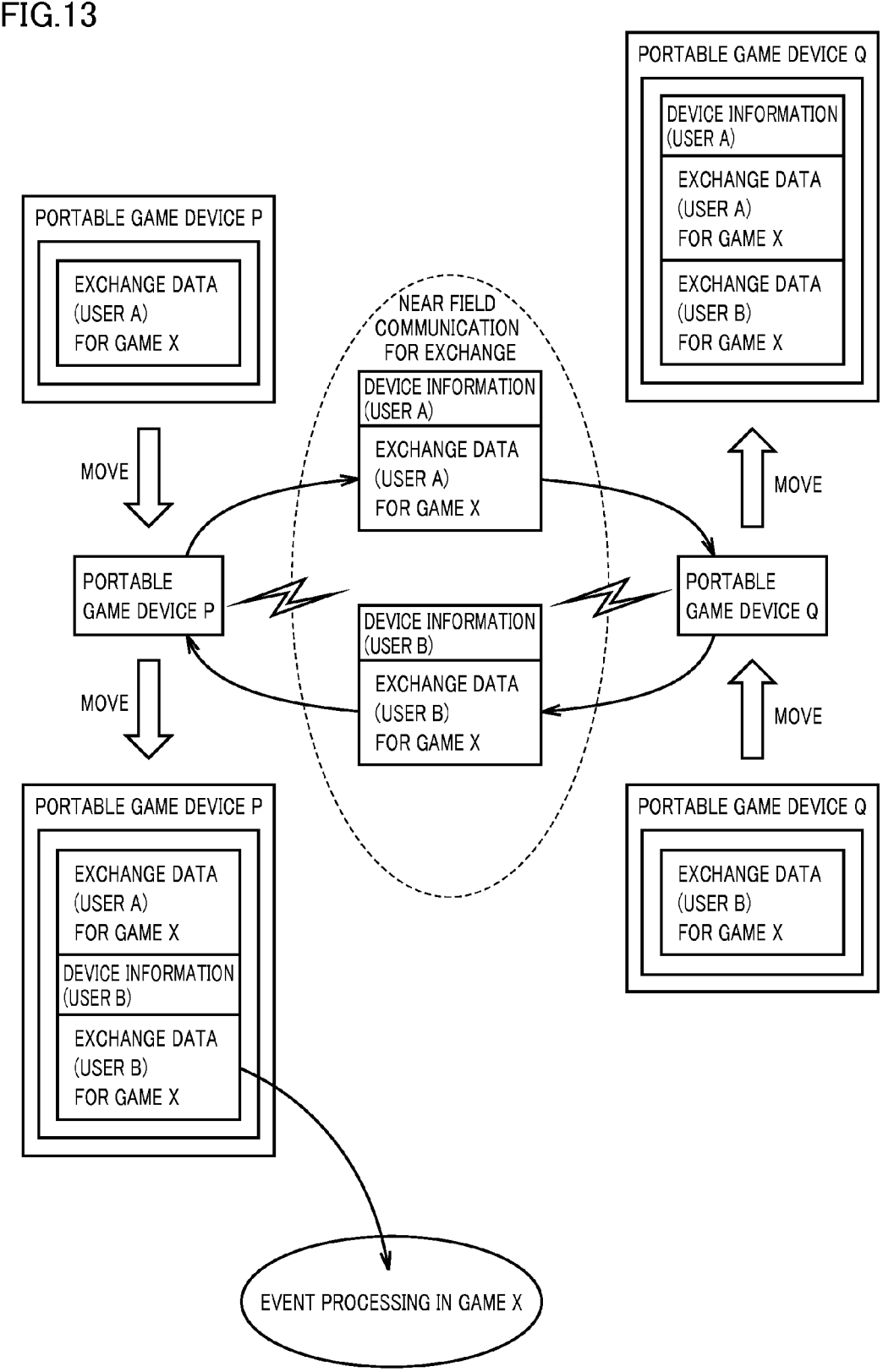
FIG. 13 shows an exemplary illustrative non-limiting diagram for illustrating a case where near field communication for exchange is carried out according to a second exemplary embodiment.

FIG. 13 is a diagram for illustrating a case where near field communication for exchange according to the present second embodiment is carried out.

Referring to FIG. 13, in the present example, a case where a user goes out with his/her portable game device is assumed by way of example.

Here, it is assumed that portable game device P is made use of as a device possessed by user A. In addition, it is assumed that portable game device Q is made use of as a device possessed by user B.

Then, game X which is a prescribed application program is executed by user A in portable game device P, and consequently exchange data for game X (user A) is stored in internal storage device 14.

In addition, as a result of execution of game X by user B in portable game device Q, exchange data for game X (user B) is stored in internal storage device 14.

Then, as a result of near field communication for exchange at the time when portable game devices P and Q carried by the users pass each other, communication for transmitting and receiving their exchange data is carried out.

In the present embodiment, communication for transmitting and receiving exchange data for user A included in the exchange data for game X and exchange data for user B included in the exchange data for game X between portable game devices P and Q is shown. In addition, communication for transmitting and receiving also device information of portable game device P and portable game device Q therebetween during communication is shown. The device information includes information set and registered in advance in response to a user's instruction in the portable game device, although the description will be given later. In the present embodiment, by way of example, device information (user A) of portable game device P set and registered by user A is transmitted to portable game device Q together with exchange data for user A. In addition, by way of example, device information (user B) of portable game device Q set and registered by user B is transmitted to portable game device P together with exchange data for user B.

Thus, portable game device P will hold exchange data (user B) obtained from portable game device Q and device information (user B) of portable game device Q in addition to the exchange data (user A) for game X.

On the other hand, portable game device Q will hold the exchange data (user A) for game X and device information (user A) of portable game device P in addition to the exchange data (user B) for game X.

Then, when user A executes game X in portable game device P, event processing based on exchanged data of another user (user B) is performed in game device X.

Specifically, by way of example, in portable game device P, as a result of near field communication for exchange at the time of passing, event processing based on the exchange data (user B) for game X obtained from portable game device Q is performed.

Therefore, event processing based on data of another user obtained through near field communication for exchange at the time of passing can be performed.

By way of example of this event processing, for example, such processing that a character included in the exchange data is caused to appear and talk to for obtaining information or an item, or the like is exemplified.

Figure 14:
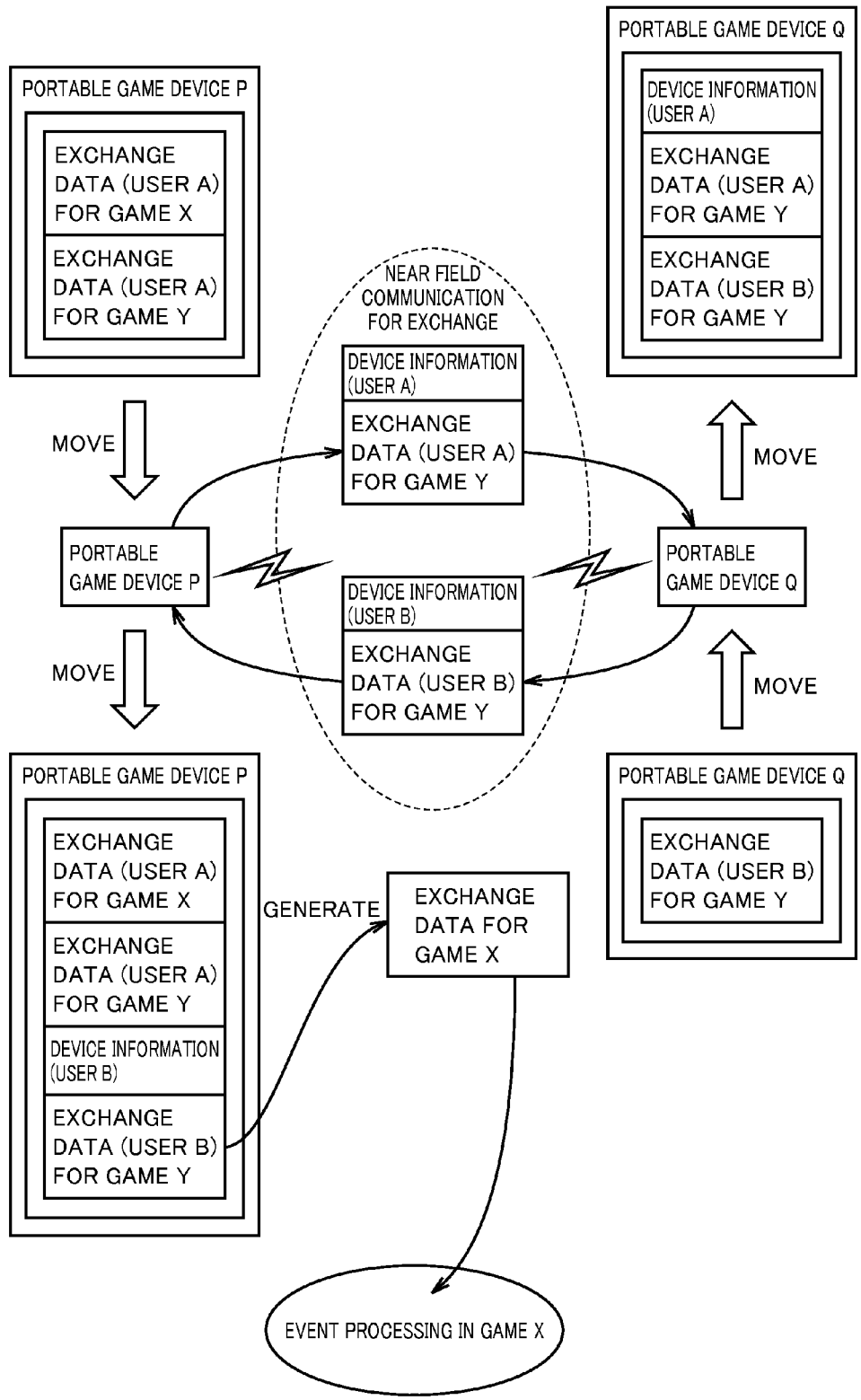
FIG. 14 shows an exemplary illustrative non-limiting diagram for illustrating a case where other near field communication for exchange is carried out according to the second exemplary embodiment.

FIG. 14 is a diagram for illustrating a case where other near field communication for exchange according to the present second embodiment is carried out.

Referring to FIG. 14, it is assumed that portable game device P is made use of as a device possessed by user A. In addition, it is assumed that portable game device Q is made use of as a device possessed by user B.

Then, game X which is an application program is executed by user A in portable game device P, and consequently the exchange data (user A) for game X is stored in internal storage device 14.

In addition, as a result of execution of game Y which is another application program different from the application program of game X by user A in portable game device P, exchange data (user A) for game Y is stored in internal storage device 14.

Meanwhile, as a result of execution of game Y different from game X by user B in portable game device Q, exchange data (user B) for game Y is stored in internal storage device 14. Here, it is assumed that portable game device Q does not store exchange data for game X.

Then, when game devices P and Q carried by respective users pass each other, near field communication for exchange for exchange data of game Y occurs. Game X, however, is not stored in portable game device Q, and therefore transmission and reception of exchange data is not carried out. Namely, near field communication for exchange occurs for the same game. During such communication as well, communication for transmitting and receiving device information of portable game device P and portable game device Q therebetween takes place. In the present example, by way of example, device information (user A) of portable game device P set and registered by user A is transmitted to portable game device Q together with the exchange data for user A. In addition, by way of example, device information (user B) of portable game device Q set and registered by user B is transmitted to portable game device P together with the exchange data for user B.

In the present example, in the processing as well, when user A executes game X in portable game device P, event processing based on exchange data generated in game X is performed by generating exchange data in game X based on the received device information of portable game device Q.

Specifically, by way of example, in portable game device P, as a result of near field communication for exchange at the time of passing, device information obtained from portable game device Q is obtained. Then, exchange data for game X which can be processed by game X is generated based on the obtained device information. Then, event processing based on the generated exchange data for game X is performed.

Therefore, even in the case not obtaining data on the same game through near field communication for exchange at the time of passing, event processing based on the generated data can be performed by using the data obtained through near field communication for exchange to generate the exchange data which can be processed by the game. Namely, even in the case not obtaining data on the same game through near field communication for exchange, event processing based on obtained data of another portable game device can be performed. Therefore, opportunities for event processing increase and zest of data communication can be enhanced.

Figure 15:
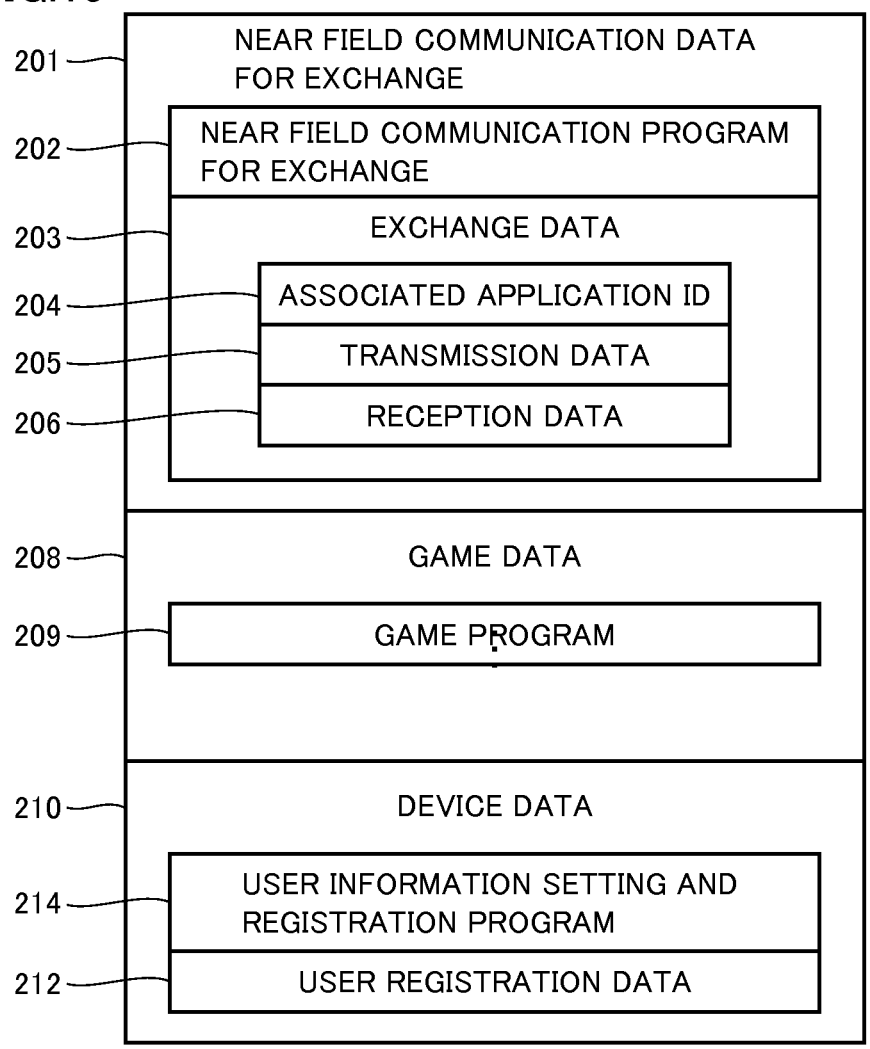
FIG. 15 shows an exemplary illustrative non-limiting diagram for illustrating one example of a program and information stored in internal storage device 14 of portable game device 1 according to the second exemplary embodiment.

FIG. 15 is a diagram for illustrating one example of a program and information stored in internal storage device 14 in portable game device 1 according to the present second embodiment.

Referring to FIG. 15, FIG. 15 is different from FIG. 5 in that device data 210 is further provided. Other configurations are basically similar to those in FIG. 5. It is noted that reception data 206 is assumed to include also device information of another portable game device received from another portable game device.

Device data 210 includes a user information setting and registration program 214 and user registration data 212.

Device data 210 is loaded from internal storage device 14 to main memory 15 as necessary.

User information setting and registration program 214 is a program for performing processing for registering user information as user registration data. It is assumed that, by starting up and executing the program, a prescribed interface screen for accepting a user's operation instruction is displayed on display device 12. Then, as the user inputs information through input device 11 in the prescribed interface screen, the input information is set and registered as user registration data 212.

It is assumed, for example, that user information setting and registration program 214 has been stored (pre-installed) in portable game device 1 in advance since shipment or the like by way of example. Alternatively, the user information setting and registration program may be read from an external storage device and stored in internal storage device 14, or may be received from another portable game device or a server device and stored in internal storage device 14.

In the present example, for example, it is assumed that game program 209 corresponds to game X.

Though a case where only one game program 209 is provided in game data 208 is shown here, a configuration may be such that an internally-stored game program is provided as described with reference to FIG. 5.

FIG. 16 is a diagram for illustrating exchange data stored in internal storage device 14 in portable game device 1 according to the present second embodiment.

Referring to FIG. 16(A), here, one example of exchange data for game X stored in internal storage device 14 when game program 209 is executed is shown, which is the same as described with reference to FIG. 6(A).

As described above, for example, when the exchange data is transmitted from portable game device P as transmission data to portable game device Q, event processing based on the exchange data is performed in game X executed by portable game device Q. For example, in game X, a character based on data representing characteristics of the character included in the exchange data is displayed.

Referring to FIG. 16(B), here, one example of user registration data stored in internal storage device 14 when user information setting and registration program 214 is executed is shown.

Specifically, a case where data on user information input in response to a user's instruction is stored is shown. By way of example, in the present embodiment, it is assumed that data on "sex", "birthday", and "user name" is stored as user information and "sex", "birthday", and "user name" are stored as "male", "mm dd", and "abcd", respectively.

For example, when the exchange data is transmitted from portable game device P as transmission data to portable game device Q, device information including the user registration data registered in portable game device P is transmitted to portable game device Q together with the exchange data. In contrast, from portable game device Q as well, device information including the user registration data registered in portable game device Q is transmitted to portable game device P together with the exchange data.

Since processing for near field communication for exchange according to the present second embodiment is the same as that described with reference to FIG. 7, detailed description thereof will not be repeated.

Figure 17:
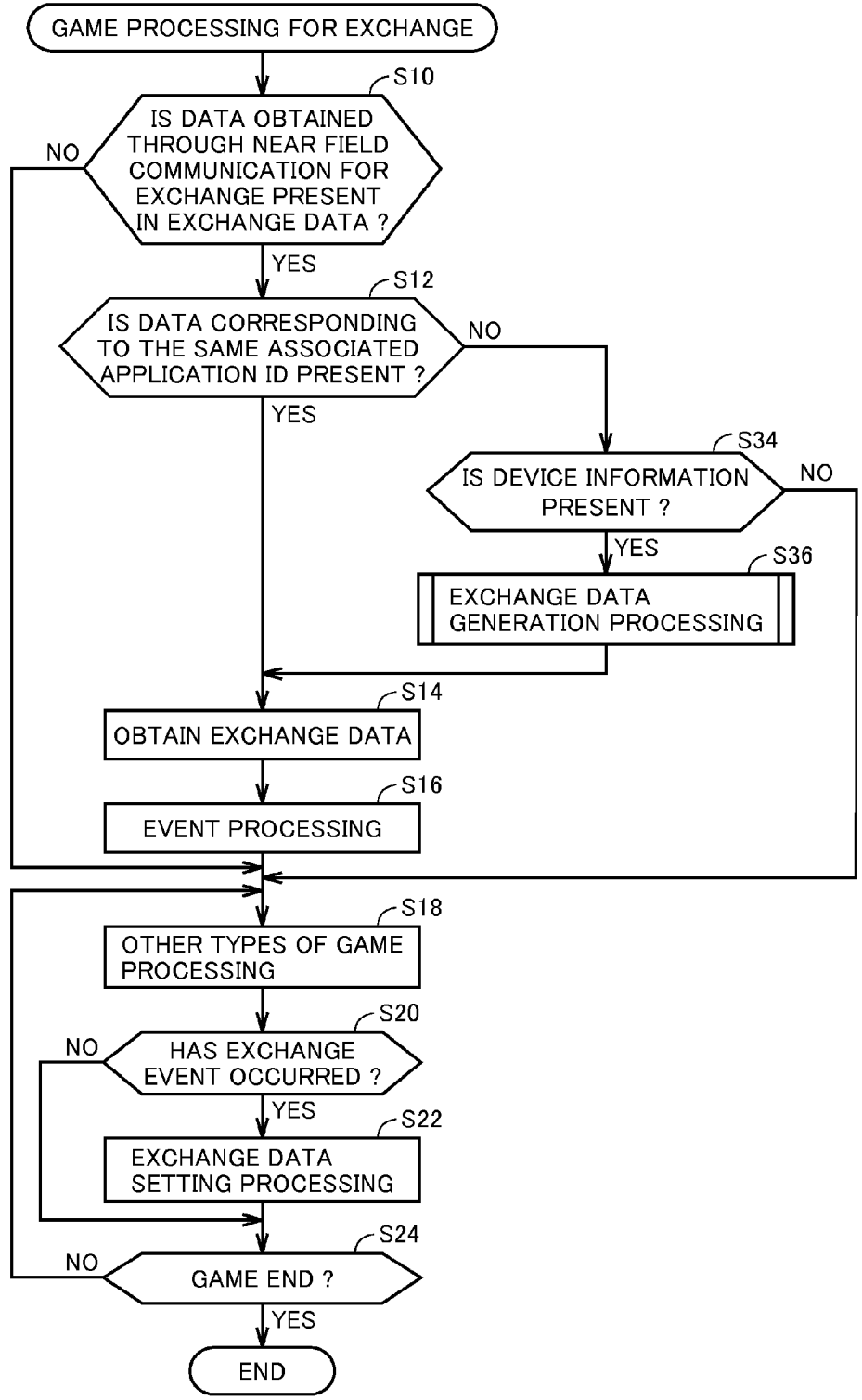
FIG. 17 shows an exemplary illustrative non-limiting flowchart for illustrating a flow of game processing in portable game device 1 according to the second exemplary embodiment.

FIG. 17 is a flowchart for illustrating a flow of game processing in portable game device 1 according to the present second embodiment.

Referring to FIG. 17, as compared with the flow of game processing described with reference to FIG. 8, it is different in including steps S34, S36 instead of steps S26 to S32. Since other steps are the same, detailed description thereof will not be repeated.

In this regard, when it is determined in step S12 that the exchange data corresponding to the associated application ID the same as the associated application ID corresponding to game program 209 being executed is not present (NO in step S12), whether or not device information is present is determined (step S34). In the present example, whether or not device information of another portable game device is present in reception data 206 of exchange data 203 is determined. Though a case of determination as to presence or absence of device information is described here, in such a case that device information is included without fail when obtained data is determined to be present in reception data 206 of exchange data 203 in step S10 (YES in step S10), step S34 may be skipped and the process may proceed to step S36.

Then, when it is determined that device information is present (YES in step S34), processing for generating exchange data is performed (step S36). The processing for generating exchange data will be described later.

Then, the process proceeds to step S14, where generated exchange data is obtained (step S14).

Subsequent processing is the same as described above.

When it is determined in step S34 that device information is not present (NO in step S34), the process proceeds to step S18 without obtaining exchange data.

Figure 18:
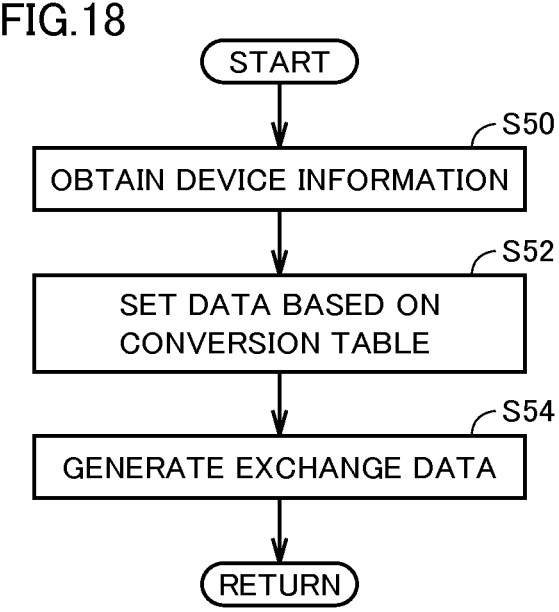
FIG. 18 shows an exemplary illustrative non-limiting flowchart for illustrating processing for converting exchange data according to the second exemplary embodiment.

FIG. 18 is a flowchart for illustrating the processing for generating the exchange data according to the present second embodiment.

Referring to FIG. 18, initially, device information is obtained (step S50). Specifically, user registration data included in device information transmitted from another portable game device is obtained.

Then, data is set based on a conversion table in accordance with the obtained user registration data (step S52).

Then, exchange data for a corresponding application (game X) is generated in accordance with the set data (step S54).

Then, the process ends (return).

Figure 19:
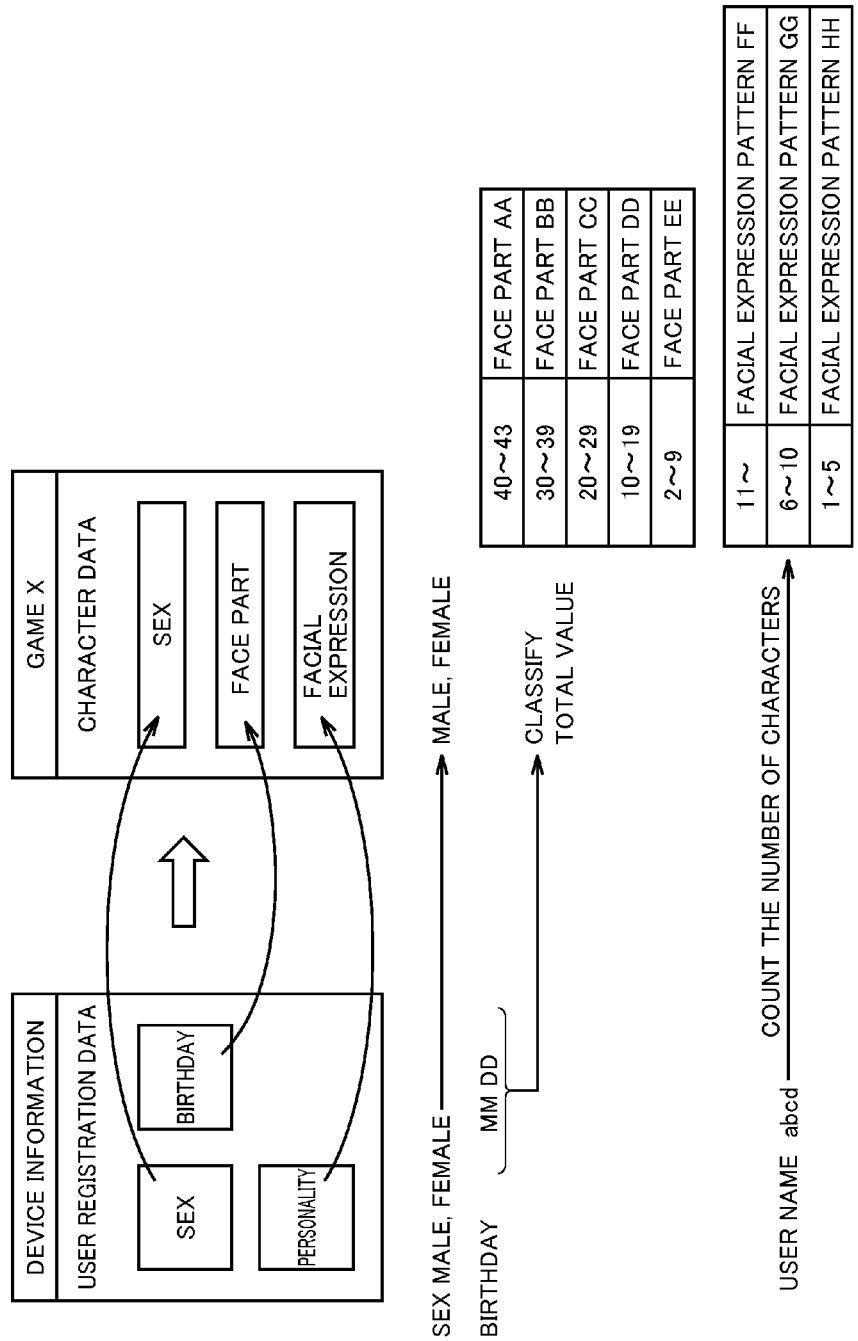
FIG. 19 shows an exemplary illustrative non-limiting diagram for illustrating a specific example of processing for converting exchange data according to the second exemplary embodiment.

FIG. 19 is a diagram for illustrating a specific example of the processing for generating the exchange data according to the present second embodiment.

Referring to FIG. 19, here, a case where exchange data for game X is generated as exchange data based on the user registration data included in device information is shown.

In the present embodiment, by way of example, data on a character included in exchange data for game X is set in accordance with the user registration data included in device information.

Specifically, a table for converting "sex" in the user information included in the user registration data to "sex" representing a characteristic of a character in game X, a table for converting "birthday" in the user information to "face part" representing a characteristic of a character in game X, and a table for converting "user name" in the user information to "facial expression" representing a characteristic of a character in game X are provided. The table for conversion is included in the game program for game X.

By way of example, with the table for converting "sex", "sex male", "sex female" in the user information are set to "sex male", "sex female" representing characteristics of characters in game X, respectively.

In addition, with the table for converting "birthday" in the user information, a total value for numerics brought in correspondence with day and month "mm dd" is classified and set to one of a plurality of "face parts". In the present example, by way of example, when the total value is "from 2 to 9," conversion to "face part EE" is made, when the total value is "from 10 to 19," conversion to "face part DD" is made, when the total value is "from 20 to 29," conversion to "face part CC" is made, when the total value is "from 30 to 39," conversion to "face part BB" is made, and when the total value is "from 40 to 43," conversion to "face part AA" is made.

In addition, with the table for converting "user name" in the user information, the number of characters in the user name is counted for classification, so that one of the plurality of "facial expression patterns" is set. In the present example, by way of example, when the number of characters is "from 1 to 5," "facial expression pattern FF" is set, when the number of characters is "from 6 to 10," "facial expression pattern GG" is set, and when the number of characters is equal to or greater than "11", "facial expression pattern HH" is set.

Through the processing, exchange data for game X can be generated based on device information transmitted from another portable game device. Namely, exchange data for a prescribed application can be generated based on the received data. Then, event processing based on the generated exchange data can be performed.

Figure 20:
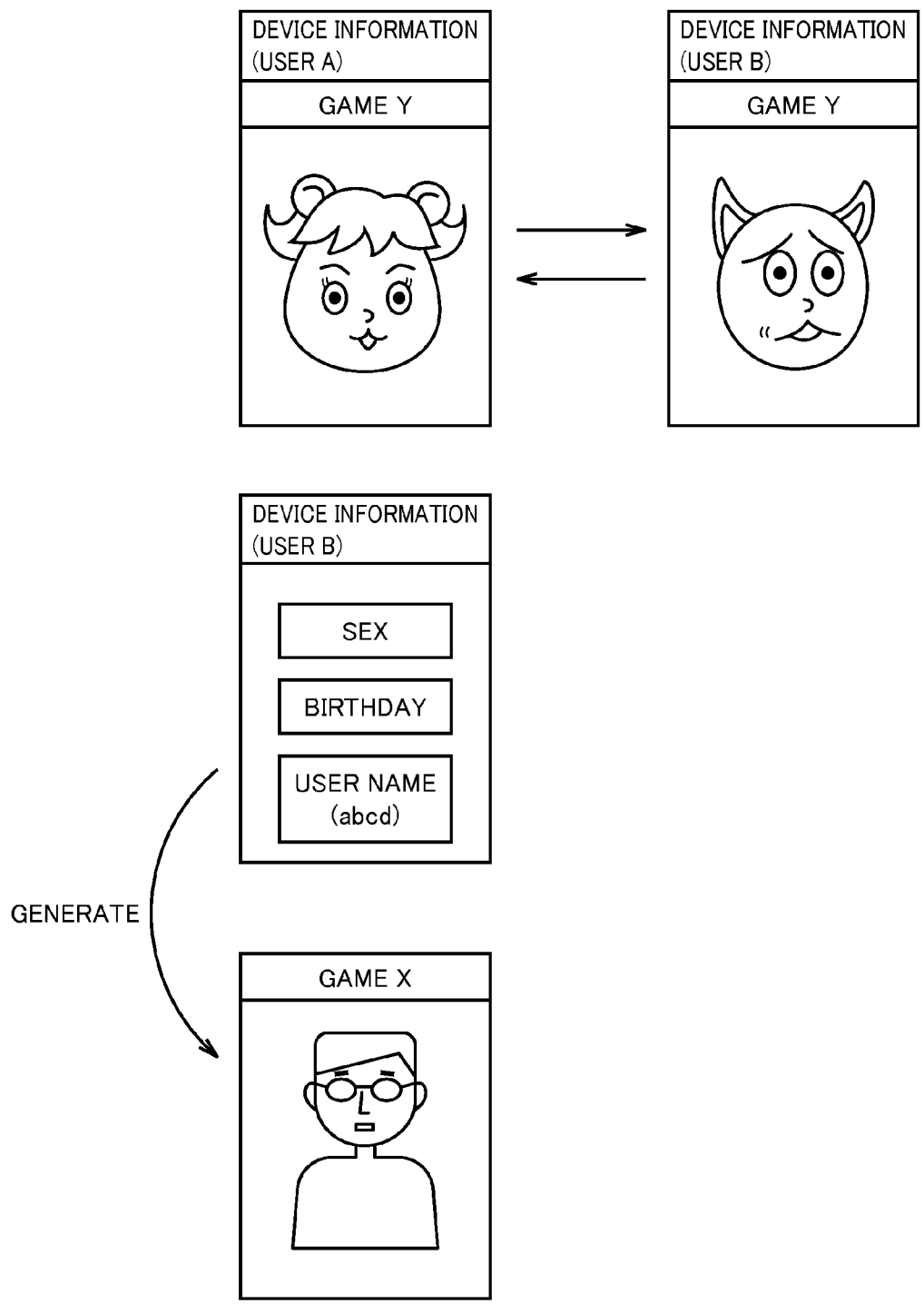
FIG. 20 shows an exemplary illustrative non-limiting diagram for illustrating a concept of transmission and reception and subsequent processing of exchange data according to the second exemplary embodiment.

FIG. 20 is a diagram for illustrating a concept of transmission and reception and subsequent processing of the exchange data and the device information according to the present second embodiment.

Referring to FIG. 20, in the present example, a case where exchange data on an associated application ID corresponding to the same game program 209 is transmitted and received is shown.

Here, exchange data for game Y is transmitted and received, and for example, when portable game devices P and Q pass each other, exchange data for game Y transmitted from portable game device Q is received by portable game device P. By way of example, a case where data on a character of "monster" is transmitted and received as the exchange data is shown. Then, when game Y is executed, event processing based on the received exchange data for game Y is performed. For example, a character of "monster" received as the exchange data appears.

Device information of portable game devices P and Q is also transmitted and received to and from each other, and the device information of portable game device Q transmitted from portable game device Q is also received by portable game device P.

Then, when game X different from game Y is executed, exchange data for game X is generated based on the device information (user B) transmitted from portable game device Q. For example, data representing a characteristic of a character of "person" is set based on the user registration data (user A) included in the device information. Then, event processing based on the generated exchange data for game X is performed. For example, a character of a "person" appears in accordance with the generated exchange data.

Therefore, as a result of the near field communication for exchange at the time of passing, even though exchange data for the same application program is not transmitted or received, exchange data for the same application program can be generated based on device information received through the near field communication for exchange. Then, event processing using the generated exchange data can be performed.

Namely, even though a portable game device and another portable game device do not have data which can be made use of by the same application program, an opportunity for data communication (exchange) with another portable game device is made use of to thereby generate application data which can be made use of by the portable game device itself. Thus, zest of data communication can be enhanced.

Though a case where user registration data included in the device information is obtained and data on a character for the exchange data is set has been described in the present embodiment, the data is not particularly limited to user registration data registered through user's input. Information specific to a device, such as data registered in advance as a device identification number, may be used to generate exchange data. In addition, though a case where tables for converting sex, birthday, user name, and the like to sex, face part, and facial expression pattern, respectively are provided has been described by way of example in the present example, the table is not particularly limited to those tables. A part of data included in the device information should only be made use of to thereby provide as appropriate a table capable of conversion to exchange data for an application to be generated.

<Other Embodiments>

In the configuration above, a scheme with which exchange data for the same game is transmitted and received (that is, exchanged) between portable game device P and portable game device Q has been described, however, exchange data does not necessarily have to be exchanged. A scheme with which portable game device P only receives exchange data from portable game device Q is also similarly applicable. Specifically, instead of exchange data, list information of associated application IDs in a game program stored in portable game device P is transmitted from portable game device P to portable game device Q. Then, a scheme with which whether or not exchange data having the same associated application ID included in the list information is present in transmission data is determined based on the received list information in portable game device Q, and when the exchange data having the same associated application ID is present, the exchange data is transmitted to portable game device P can also be adopted.

In addition, though portable game device 1 has been exemplified as a representative example of an information processing apparatus in the embodiments described above, the information processing apparatus is not limited thereto and it may be a portable information processing apparatus such as a portable telephone or a smartphone. Moreover, though a configuration of a portable information processing apparatus such as a portable game device has mainly be described in the present example, an information processing apparatus which is not particularly portable is applicable.

Furthermore, an application executable by a personal computer may be provided as a program according to the present embodiment. Here, the program according to the present embodiment may be incorporated as a partial function of various applications executed on the personal computer.

In addition, in the embodiment above, though a single information processing apparatus (portable game device) performs a plurality of processes shown in FIGS. 7 to 9 and 17, 18, in another embodiment, the plurality of processes may be performed by a plurality of information processing apparatuses (for example, a portable game device and a server device) in a distributed manner. Moreover, the plurality of processes shown in FIGS. 7 to 9 and 17, 18 may be performed by one computer (processor 13) or by a plurality of computers in a distributed manner. Furthermore, the plurality of processes may partially or entirely be realized by a dedicated circuit.

Furthermore, the plurality of processes above in the present embodiment may also be performed by a plurality of networked devices (including WAN and LAN) in a distributed manner, or may also be performed by a network system or a what is called a cloud network in which a prescribed server performs main processing and thereafter processing results are distributed to information processing apparatuses.

With regard to processing for the near field communication for exchange above, portable game devices present at a short distance from each other may communicate with each other with the following method, in addition to communication via direct connection between portable game devices present at a short distance from each other. For example, it is assumed that a portable game device is equipped with the GPS. The portable game device transmits to a prescribed server, position information data obtained by the GPS, time and date information data at the time when position information data was obtained, and data for application. The server uses the position information data and the time and date information data transmitted from a plurality of portable game devices to determine and extract a portable game device that has come within a prescribed distance during certain time periods. Namely, the server uses position information from each portable game device to determine whether or not portable game devices have passed each other. Then, data for application may be transmitted from the server to each portable game device such that the data for application is exchanged with a portable game device determined as having passed.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program and executable by a computer of an information processing apparatus, said information processing program causing the computer of the information processing apparatus capable of communicating with another information processing apparatus to function as:
   a data reception unit configured to receive application data which can be made use of by an application program from said another information processing apparatus;
   a data determination unit configured to determine whether said received application data is data made use of by a first application program executed by the information processing apparatus; and
   a data conversion unit configured to convert the received application data or device information included in the received application data to application data made use of by said first application program executed by the information processing apparatus when said data determination unit determines that said received application data is not data made use of by said first application program executed by the information processing apparatus.

2. The non-transitory storage medium according to claim 1, causing said computer to function as a data transmission unit configured to transmit application data which can be made use of by said application program to said another information processing apparatus.

3. The non-transitory storage medium according to claim 1, wherein said information processing apparatus can selectively execute a plurality of application programs, and
   each of said plurality of application programs causes said computer to function as a data storage control unit configured to cause a memory to store application data corresponding to the application program.

4. The non-transitory storage medium according to claim 1, wherein
   said data conversion unit converts said received application data to application data made use of by said first application program executed by said information processing apparatus when said data determination unit determines that said received application data is not data made use of by the first application program executed by the information processing apparatus but data made use of by a second application program different from said first application program.

5. The non-transitory storage medium according to claim 4, wherein
   said second application program is pre-installed in said information processing apparatus.

6. The non-transitory storage medium according to claim 1, causing said computer to function as an application processing unit configured to execute said first application program by using the received application data when the application data received by said data reception unit is data made use of by the first application program executed by the information processing apparatus and executing said first application program by using the converted application data when it is not data made use of by the first application program executed by the information processing apparatus.

7. The non-transitory storage medium according to claim 1, wherein
   said received application data is data on a character.

8. The non-transitory storage medium according to claim 7, wherein
   said data on a character is data on characteristics of said character.

9. The non-transitory storage medium according to claim 1, wherein
said information processing apparatus includes a wireless communication module, and
said data reception unit communicates by radio with said another information processing apparatus by using said wireless communication module.

10. The non-transitory storage medium according to claim 9, wherein
said data reception unit communicates by radio with said another information processing apparatus by using said wireless communication module, regardless of whether said application program is executed.

11. The non-transitory storage medium according to claim 10, wherein
said data reception unit communicates by radio with said another information processing apparatus present within a certain distance by using said wireless communication module, regardless of whether said application program is executed.

12. An information processing apparatus capable of communicating with another information processing apparatus, comprising:
a data reception unit configured to receive application data which can be made use of by an application program from said another information processing apparatus;
a data determination unit configured to determine whether received said application data is data made use of by a prescribed application program executed by the information processing apparatus; and
a data conversion unit configured to convert the received application data or device information included in the received application data to application data made use of by a first application program executed by the information processing apparatus when said data determination unit determines that said received application data is not data made use of by said first application program executed by the information processing apparatus.

13. A method of controlling an information processing apparatus capable of communicating with another information processing apparatus, comprising:
receiving application data which can be made use of by an application program from said another information processing apparatus;
determining whether said received application data is data made use of by a prescribed application program executed by the information processing apparatus; and
converting the received application data or device information included in the received application data to application data made use of by said prescribed application program executed by the information processing apparatus when it is determined that said received application data is not data made use of by said prescribed application program executed by the information processing apparatus.

14. An information processing system, comprising:

an information processing apparatus; and another information processing apparatus capable of communicating with said information processing apparatus, wherein said information processing apparatus includes a data reception unit configured to receive application data which can be made use of by an application program from said another information processing apparatus, a data determination unit configured to determine whether received said application data is data made use of by a prescribed application program executed by the information processing apparatus, and a data conversion unit configured to convert the received application data or device information included in the received application data to application data made use of by a first application program executed by the information processing apparatus when said data determination unit determines that said received application data is not data made use of by said first application program executed by the information processing apparatus.

* * * * *